INVENTOR
R. C. AVERY
BY
P. C. Smith
ATTORNEY

June 8, 1954 R. C. AVERY 2,680,781

TRANSLATING ARRANGEMENT

Filed Nov. 8, 1949 23 Sheets-Sheet 2

INVENTOR
R. C. AVERY
BY
R. C. Smith
ATTORNEY

INVENTOR
R. C. AVERY
BY P. C. Smith
ATTORNEY

June 8, 1954 R. C. AVERY 2,680,781

TRANSLATING ARRANGEMENT

Filed Nov. 8, 1949 23 Sheets-Sheet 4

INVENTOR
R. C. AVERY
BY
P. C. Smith
ATTORNEY

June 8, 1954

R. C. AVERY 2,680,781

TRANSLATING ARRANGEMENT

Filed Nov. 8, 1949

23 Sheets-Sheet 5

INVENTOR
R. C. AVERY
BY
G. C. Smith
ATTORNEY

June 8, 1954 R. C. AVERY 2,680,781

TRANSLATING ARRANGEMENT

Filed Nov. 8, 1949 23 Sheets-Sheet 6

INVENTOR
R. C. AVERY
BY *P. C. Smith*
ATTORNEY

INVENTOR
R. C. AVERY
BY P. C. Smith
ATTORNEY

June 8, 1954 R. C. AVERY 2,680,781

TRANSLATING ARRANGEMENT

Filed Nov. 8, 1949 23 Sheets-Sheet 8

INVENTOR
R. C. AVERY
BY
P. C. Smith
ATTORNEY

June 8, 1954 R. C. AVERY 2,680,781

TRANSLATING ARRANGEMENT

Filed Nov. 8, 1949 23 Sheets-Sheet 9

INVENTOR
R. C. AVERY
BY P. C. Smith
ATTORNEY

June 8, 1954 R. C. AVERY 2,680,781

TRANSLATING ARRANGEMENT

Filed Nov. 8, 1949 23 Sheets-Sheet 10

INVENTOR
R. C. AVERY
BY P. C. Smith
ATTORNEY

June 8, 1954 R. C. AVERY 2,680,781

TRANSLATING ARRANGEMENT

Filed Nov. 8, 1949 23 Sheets-Sheet 11

INVENTOR
R. C. AVERY
BY
P. C. Smith
ATTORNEY

June 8, 1954 R. C. AVERY 2,680,781

TRANSLATING ARRANGEMENT

Filed Nov. 8, 1949 23 Sheets-Sheet 12

INVENTOR
R. C. AVERY
BY
P. C. Smith
ATTORNEY

June 8, 1954 R. C. AVERY 2,680,781

TRANSLATING ARRANGEMENT

Filed Nov. 8, 1949 23 Sheets-Sheet 13

INVENTOR
R. C. AVERY
BY P. C. Smith
ATTORNEY

INVENTOR
R. C. AVERY
BY
P. C. Smith
ATTORNEY

INVENTOR
R. C. AVERY
BY
P. C. Smith
ATTORNEY

INVENTOR
R. C. AVERY
BY P. C. Smith
ATTORNEY

INVENTOR
R. C. AVERY
BY P. C. Smith
ATTORNEY

INVENTOR
R. C. AVERY
BY P. C. Smith
ATTORNEY

INVENTOR
R. C. AVERY
BY
G. C. Smith
ATTORNEY

INVENTOR
R. C. AVERY
BY
P. C. Smith
ATTORNEY

June 8, 1954 R. C. AVERY 2,680,781

TRANSLATING ARRANGEMENT

Filed Nov. 8, 1949 23 Sheets-Sheet 21

INVENTOR
R. C. AVERY
BY P. C. Smith
ATTORNEY

INVENTOR
R. C. AVERY
BY P. C. Smith
ATTORNEY

TRANSLATING ARRANGEMENT

Filed Nov. 8, 1949

INVENTOR
R. C. AVERY
BY P. C. Smith
ATTORNEY

UNITED STATES PATENT OFFICE 2,680,781

TRANSLATING ARRANGEMENT

Robert C. Avery, Jackson Heights, N. Y., assignor to Bell Telephone Laboratories, Incorporated, New York, N. Y., a corporation of New York Application November 8, 1949, Serial No. 126,094

14 Claims. (Cl. 179—18)

The present invention relates generally to translating arrangements and more particularly to translating arrangements such as are employed in automatic telephone switching systems for translating signals transmitted by calling or analogous parties into directives whereby control equipment may effect the necessary switching operations desired by said parties.

In automatic telephone systems, such, for example, as is disclosed in Patent 2,585,904 of February 19, 1952 to A. J. Busch, it is common to provide means for registering the office code of a called subscriber and for translating such code into switching directives whereby common control equipment may effect the connections required by the calling subscriber. In the system as disclosed by Busch, cross-bar equipment is shown along with registers, senders, connectors and markers all used on a percentage basis as common equipment in one manner or the other. The present invention is disclosed as applied to such a system and consequently many details have been omitted for brevity. Reference is made to the Busch disclosure for details omitted from this disclosure as not necessary to a full understanding of the present invention.

In a system such as disclosed by Busch, upon the initiation of a call by a calling subscriber an idle marker is seized and the latter, upon determining that dial tone is required, interconnects the calling line with an idle originating register. The originating register transmits dial tone to the calling subscriber who thereupon actuates an automatic calling device, such as the well-known dial transmitter, to transmit to the originating register the signals, such as open-loop dial pulse digits, indicative of the called subscriber or other called location or party.

Previously, such originating registers, or analogous equipment, have been arranged to perform some sort of pretranslating function prior to selecting an idle marker for completion of the desired interconnection. For instance, if the calling subscriber dialed an initial zero the originating register has been arranged to select a marker immediately for completion of such an "operator" call; if a local office code was dialed the originating register has been arranged to select a marker after the called number numericals have been registered, including a party letter if required; if a service code of the X11 variety was dialed, where X could be any digit except zero or one, or if a vacant code was dialed, the marker seizure took place after the registration of the third digit; and, if a 11X toll directing code was dialed, where X could be any digit except one, followed by a called office code and numericals, the originating register seized a marker after receiving all of the digits. Furthermore such registers have been provided with translating apparatus and circuits for determining when to seize a marker depending upon the value of the first or first and second office code digits, etc.

As will be appreciated, such pretranslating functions as the above, which are by no means all inclusive, have grown to such complexity and scope as to economically preclude further expansion of originating registers for the purpose. Accordingly such pretranslating functions have been incorporated into separate apparatus and circuit units. The segregation of such functions has been accomplished previously in a toll switching office, as illustrated by Patent 2,468,300 to M. E. Maloney and F. F. Shipley of April 26, 1949. The Maloney-Shipley disclosure shows a separate pretranslator circuit associable with register-senders through suitable connectors for the purpose of pretranslation as to when the sender should seize a marker and as to what kind of a marker to seize and as to what information to send to such a marker.

The main object of the present invention is to simplify the translating arrangements used in such pretranslators. According to the present disclosure, the invention is embodied in a pretranslator which is associable, on a percentage basis, with originating registers of cross-bar offices through suitable connectors in order to perform the functions of pretranslation.

The invention is also embodied in a combined translating arrangement for translating office codes into routing information for the local area as well as for areas outside the local area.

The invention is embodied, as herein disclosed, in a translating arrangement for telephone switching systems. Registers are provided for registering therein sets of untranslated information to be translated into switching directives, such as office codes to be translated into routing information. Each set includes a plurality of items of information, such as three office code digits. The sets are arranged into groups of sets where all sets of a particular group differ from each other by only one item of information, such as office codes 231, 232 and 233 or such as code 231 for a local office and code 231, preceded by a toll directing code, for an office outside the local area where the local or outside area indication is an item of information. A number of first terminals are provided to be energized one at a time by switching means responsive to the above registrations. The switching means is arranged to energize the same terminal for each code of a group. A number of second terminals are provided, each representing, when energized, a different switching directive. Additional switching means is effective in responsive to the energization of one of said first terminals, representing a group of sets of untranslated information, and in response to the registration in the above registers of the item of different information per group to energize selectively one of said second terminals.

The above briefly outlined invention may be embodied in a pretranslator, as herein disclosed, or in any other apparatus or circuit performing translating functions, such as a marker, as herein disclosed. Translating arrangements according to the present invention considerably reduce the amount of circuits and apparatus necessary for such translating functions without sacrificing any of the utility of prior arrangements. A better understanding of the invention will be realized from the subsequent detailed description of a preferred embodiment shown by the drawings which may be described generally as follows:

Figure 22:
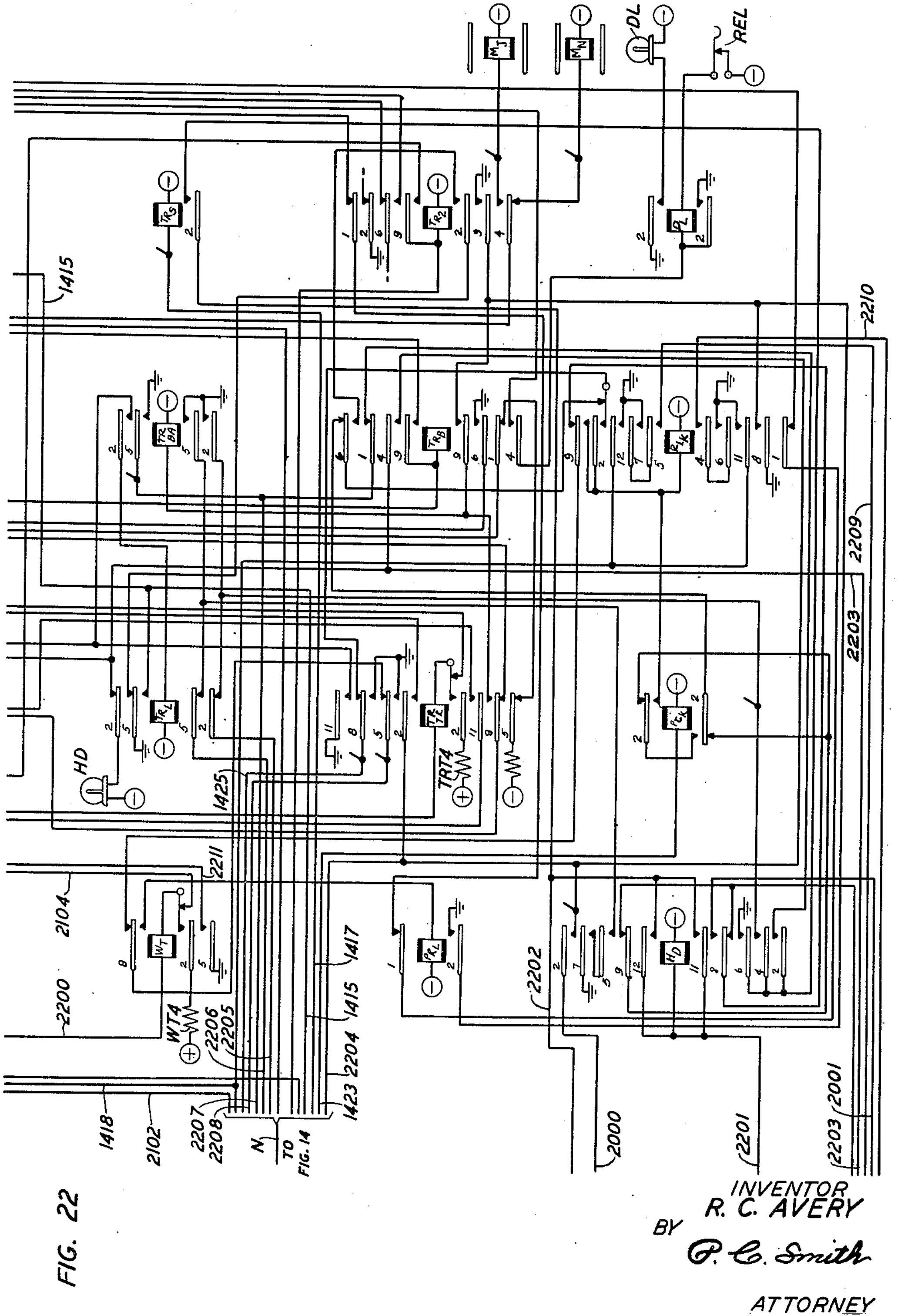
Figure 23:
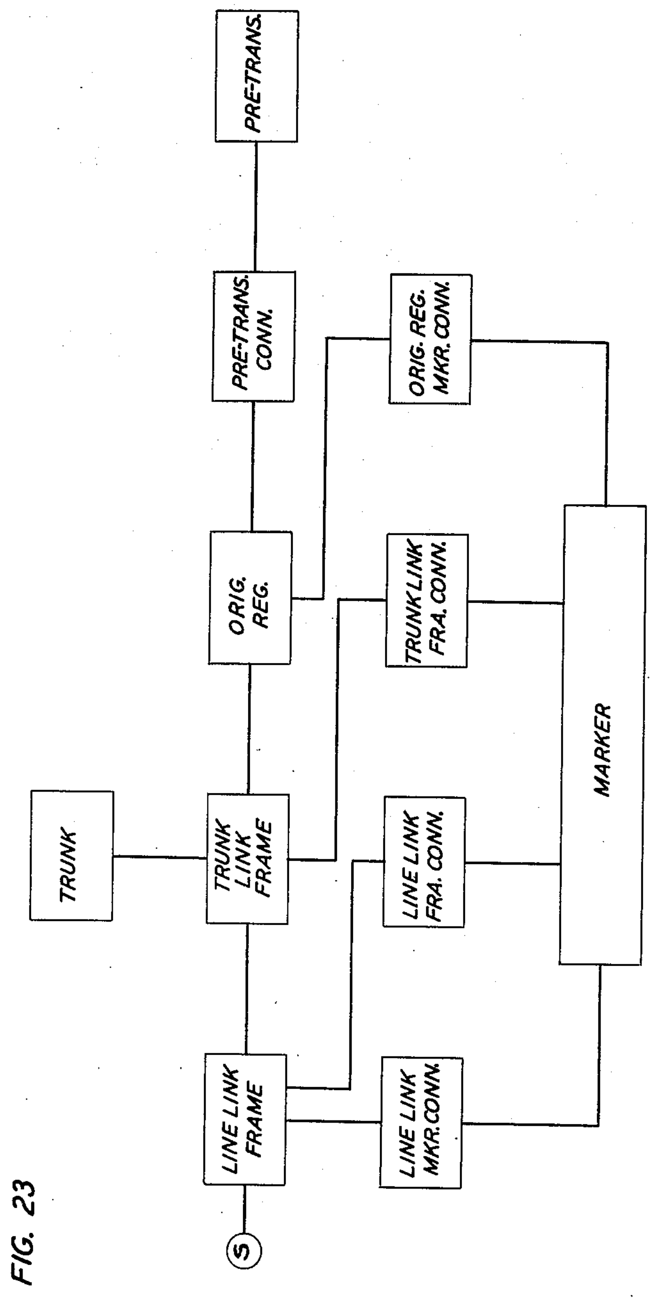
Figure 24:
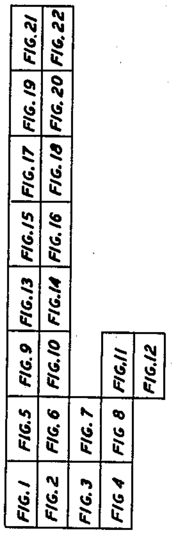

Figs. 9, 10, 13, 14 and 15 disclose details of a pretranslator connector circuit for interconnecting the originating register with a pretranslator;

Figs. 16 through 22 disclose a pretranslator circuit;

Fig. 23 illustrates, in block diagram form, the functional relationship of various equipment units of a system wherein the present invention finds utility; and, Fig. 24 shows how Figs. 1 through 22 are to be arranged to show a complete and operative circuit of which one form of the invention comprises a part.

Figure 1:
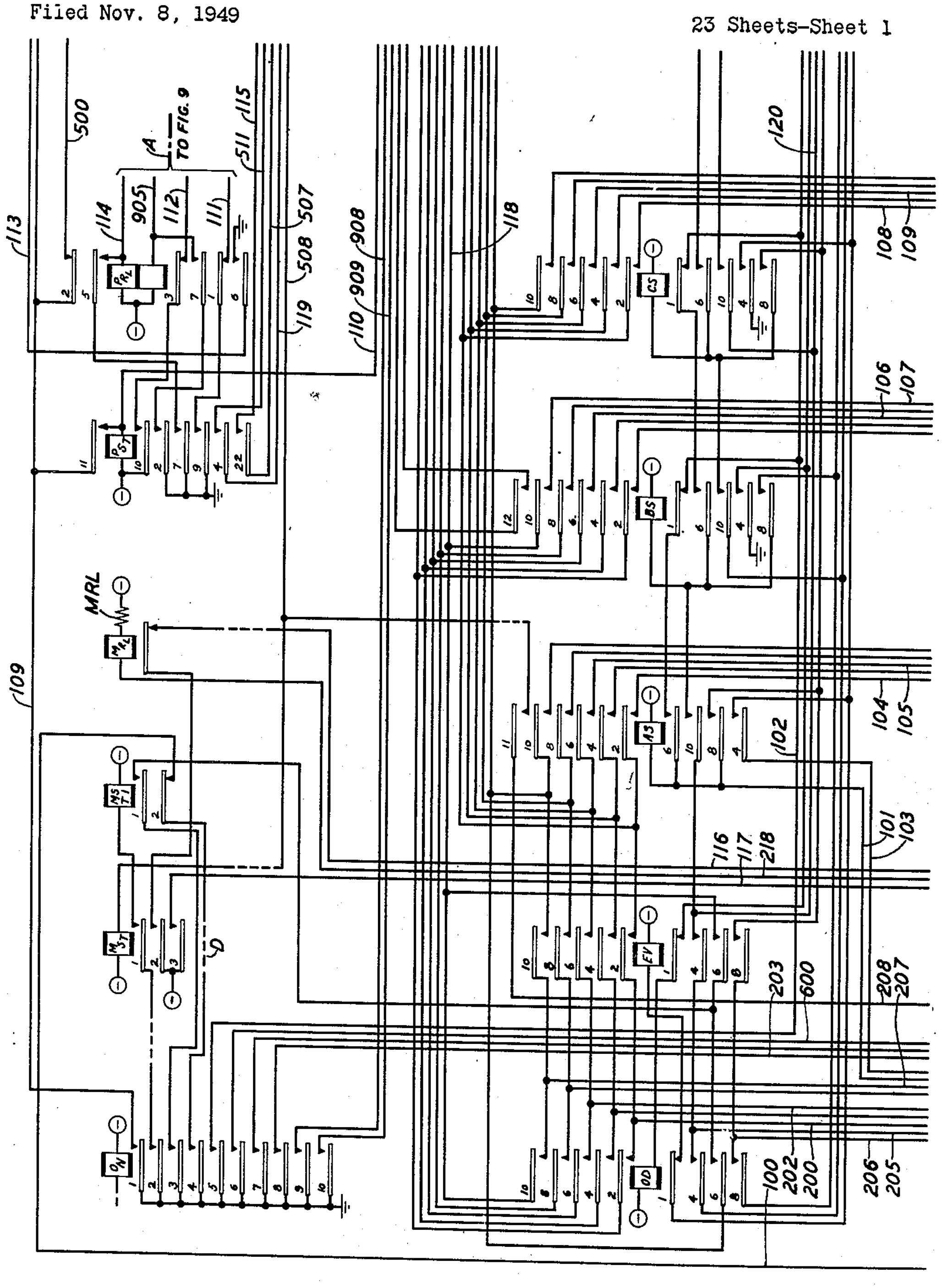
Figs. 1, 2, 5, 6 and 9 show sufficient details of an originating register to permit an understanding of the invention.

Apparatus elements will be referred to, in part, throughout the specification by symbols such as relay ON(1), meaning relay marked "ON" on Fig. 1.

Figure 2:
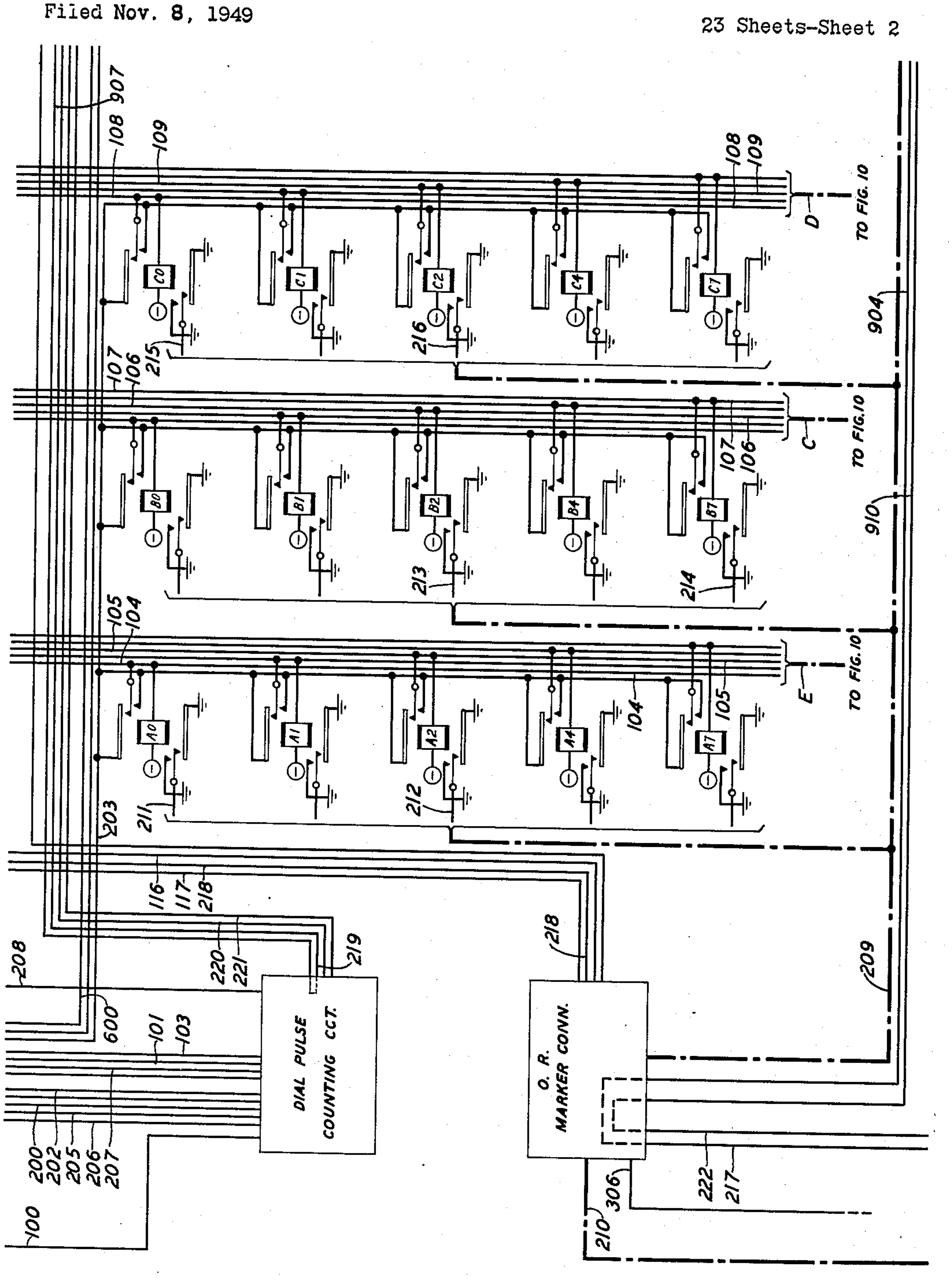
Figure 5:
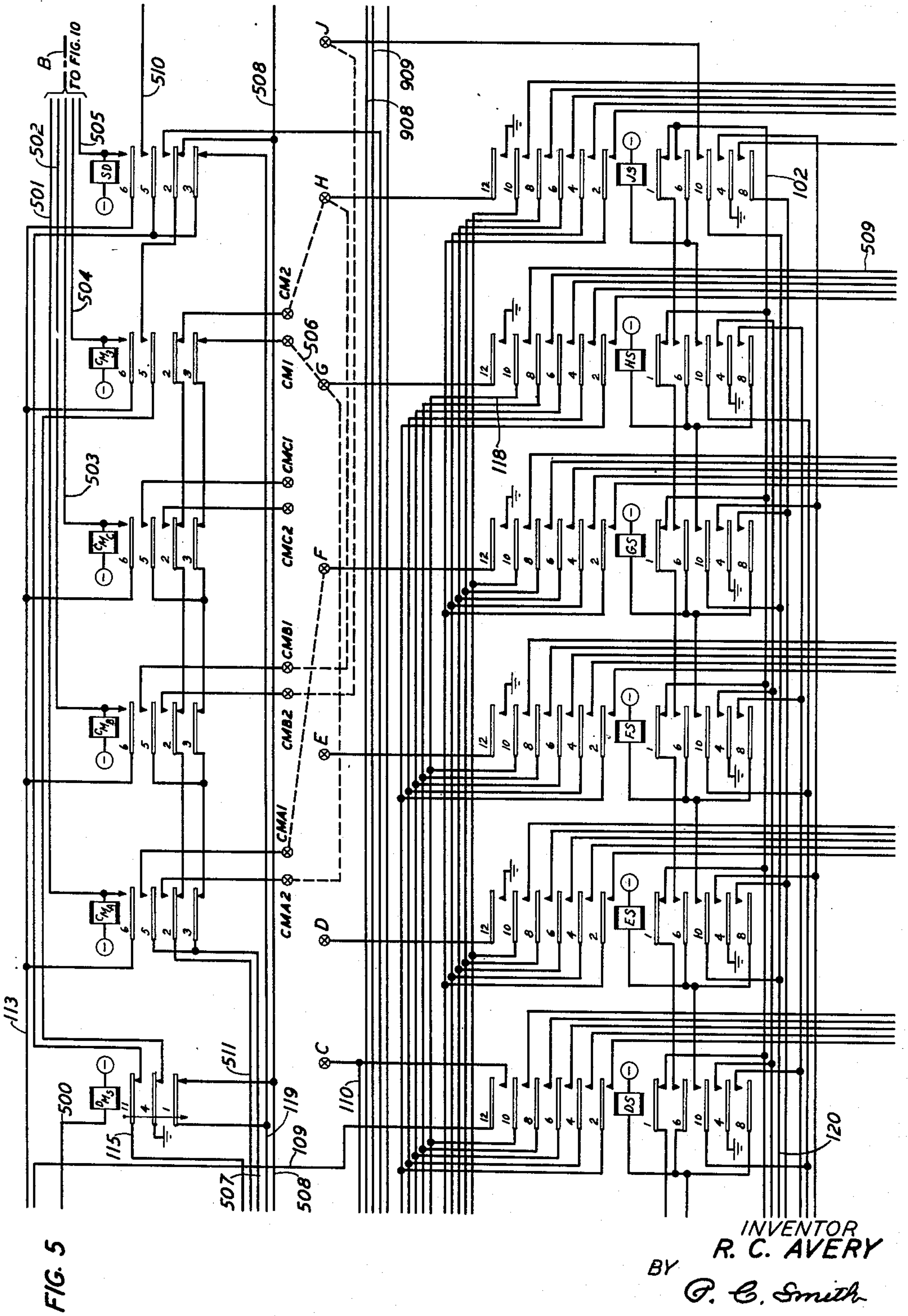
Figure 6:
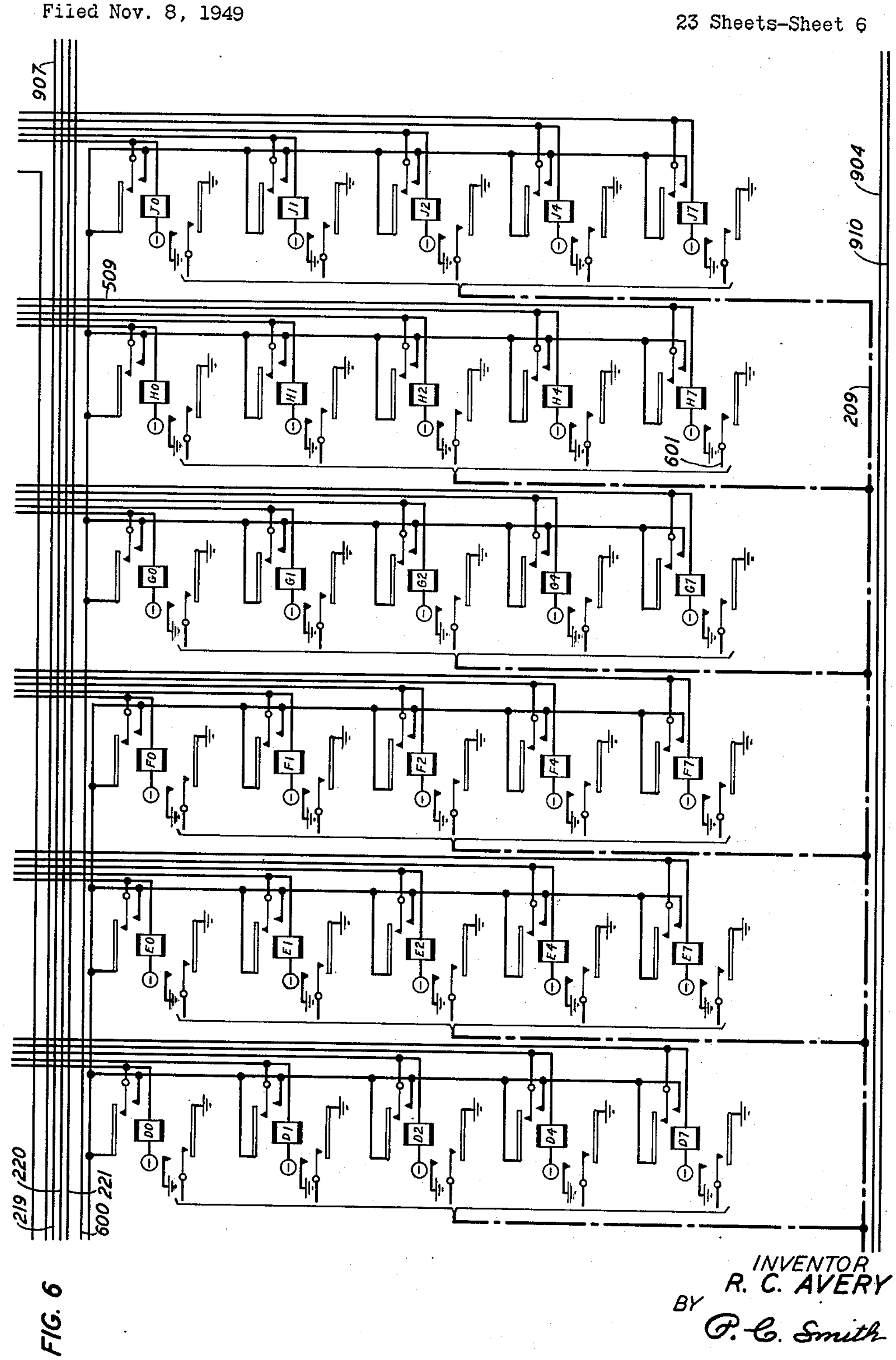
Figure 7:
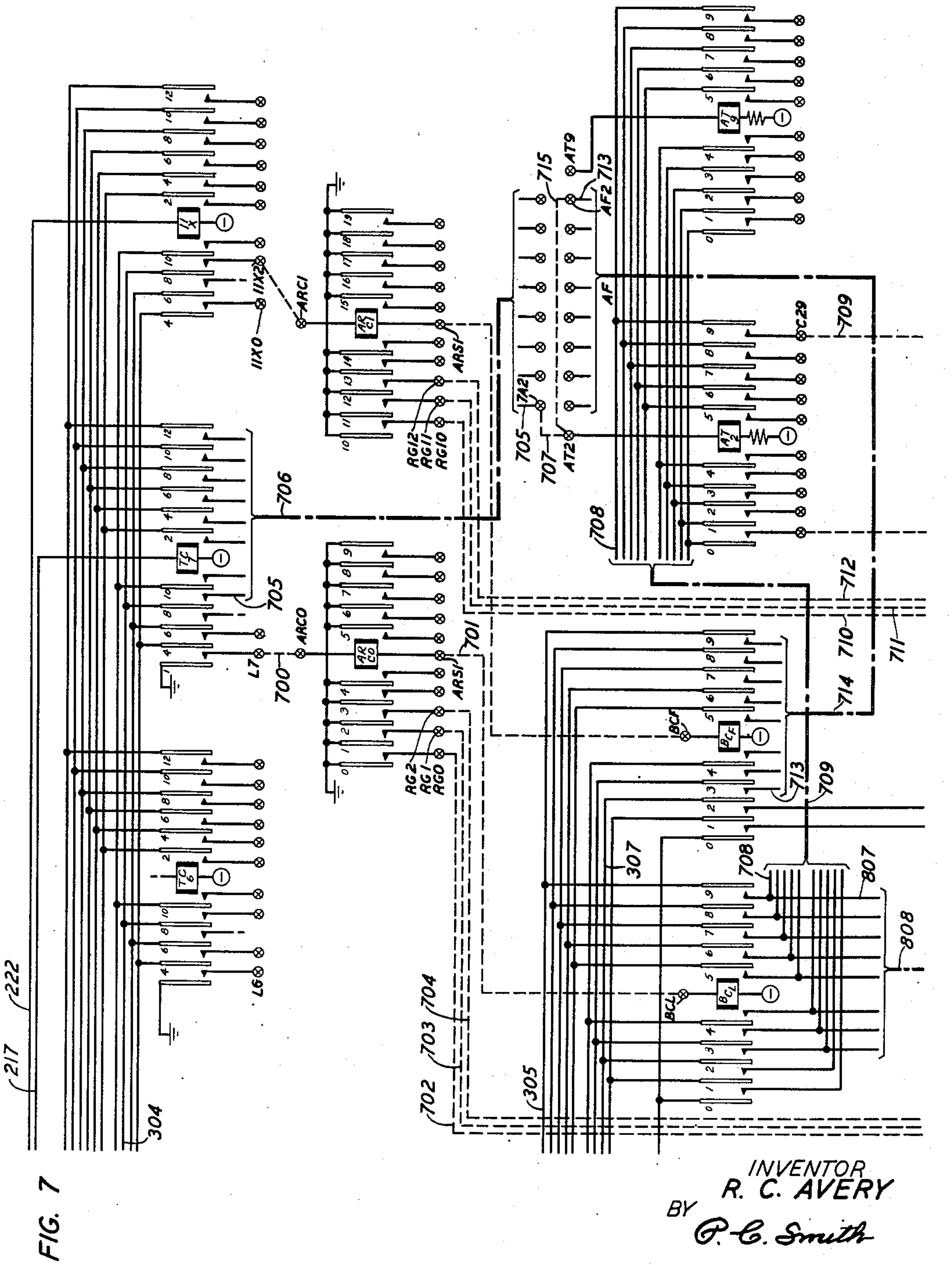
Figure 9:
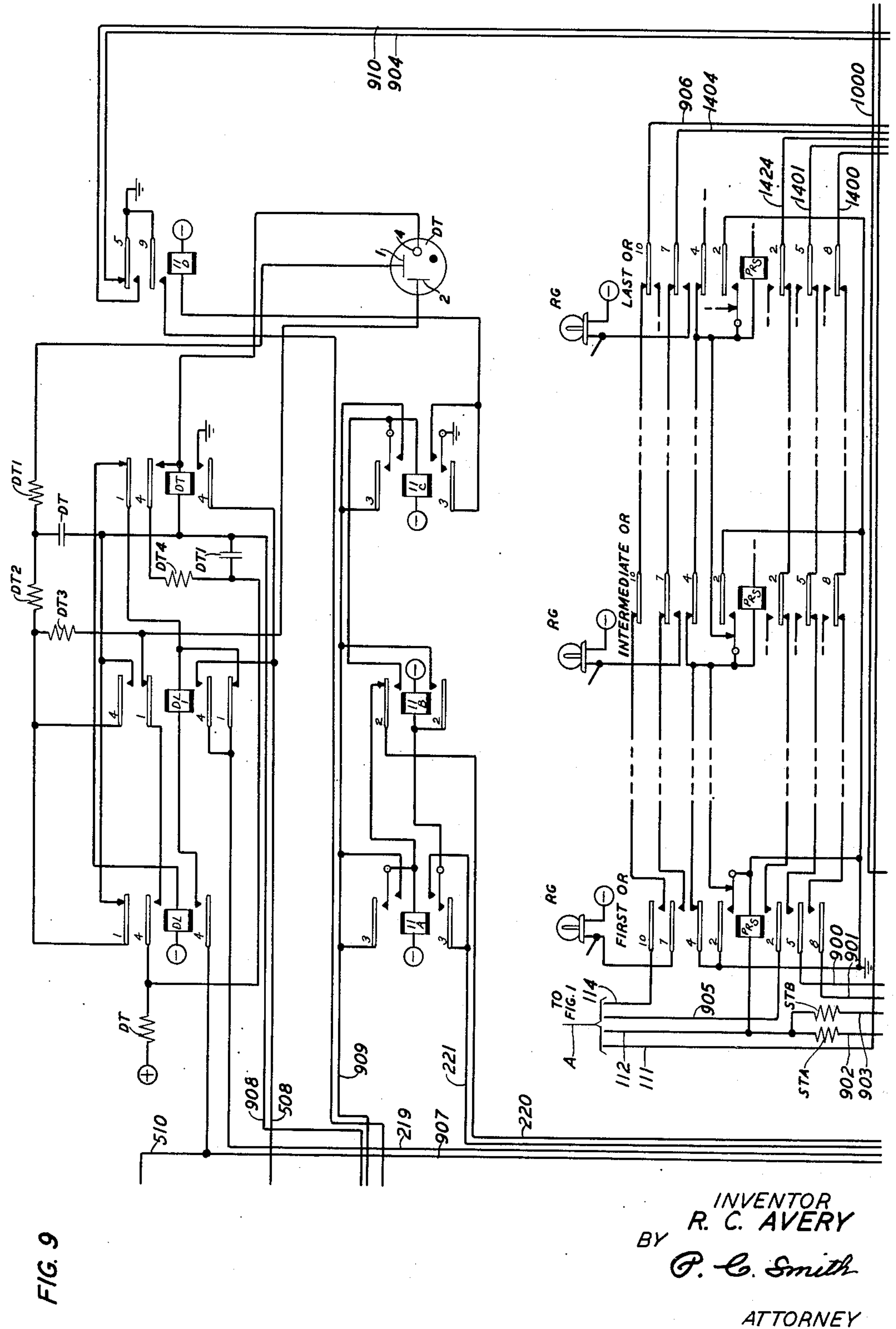

In the originating register of Figs. 1, 2, 5, 6 and 9: the upper left portion of Fig. 1 discloses one of the off-normal relays of the register control relay circuit; the upper central portion of Fig. 1 discloses part of the marker selection circuit; the upper part of Fig. 5 and the upper right portion of Fig. 1 disclose the pretranslator selection controller circuit; the upper left portion of Fig. 2 shows, in block form, the dial pulse counting circuit; the lower left part of Fig. 2 discloses, in block form, the originating register marker connector circuit; the lower portions of Figs. 1 and 5, the right part of Fig. 2 and all of Fig. 6 discloses the dial pulse register circuit; and, the upper half of Fig. 9 shows the digit timing circuit and the prefix counter circuit.

Figure 3:
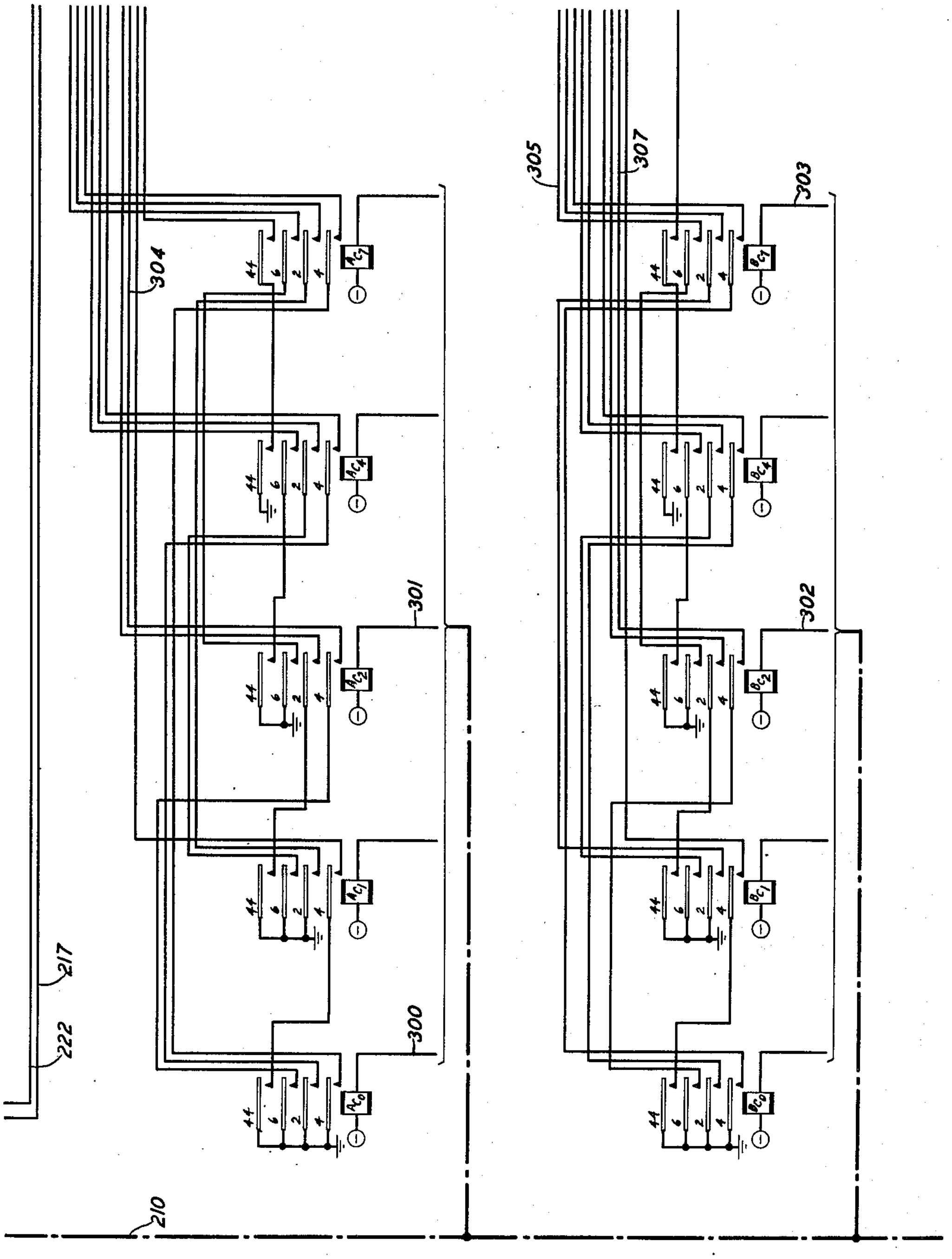
Figs. 3, 4, 7, 8, 11 and 12 show certain details of a marker circuit.
Figure 4:
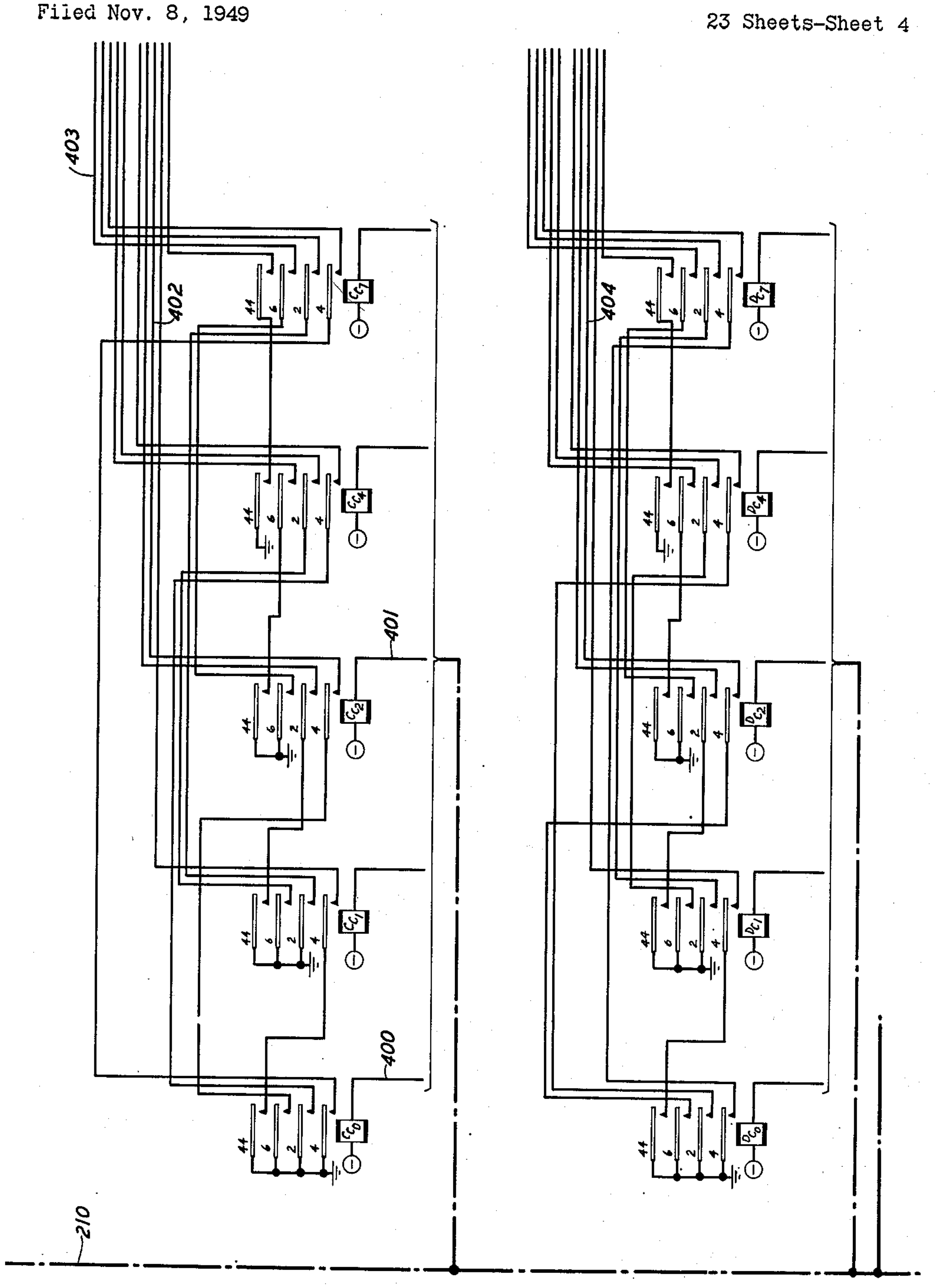

In the marker of Figs. 3, 4, 7, 8, 11 and 12; Figs. 3 and 4 show the registers for the first four digits; and, Figs. 7, 8, 11 and 12 show a combined local and foreign area translator (foreign area meaning outside of the local exchange, such as would be reached by a toll call just outside of the local area) circuit arranged according to the invention and including in Figs. 8, 11 and 12 certain route, route-series, and class-of-service relays, the operation of which, in a well-known manner, inform the marker of the switching directives necessary to complete the interconnection indicated by the called signals.

Figure 10:
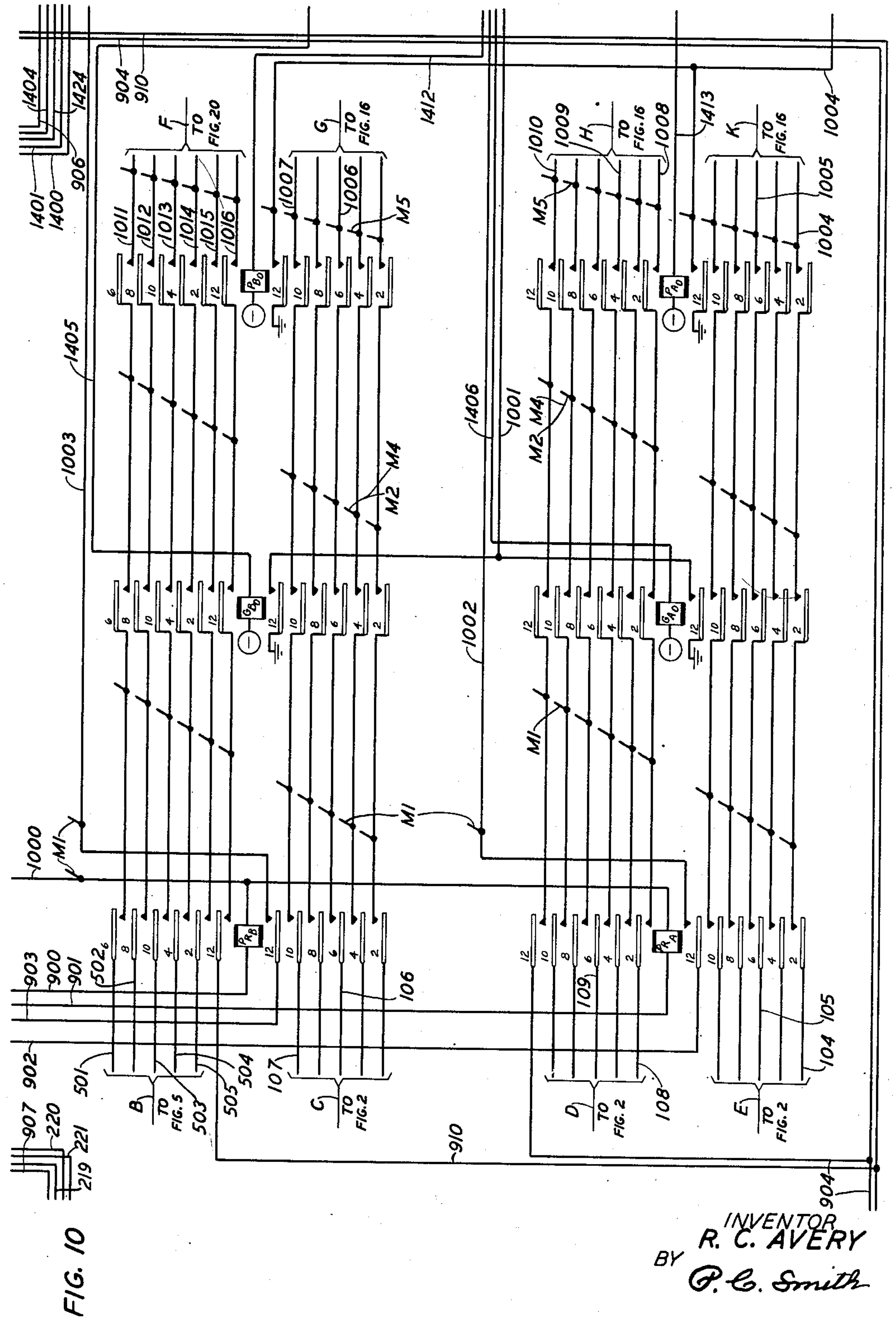
Figure 13:
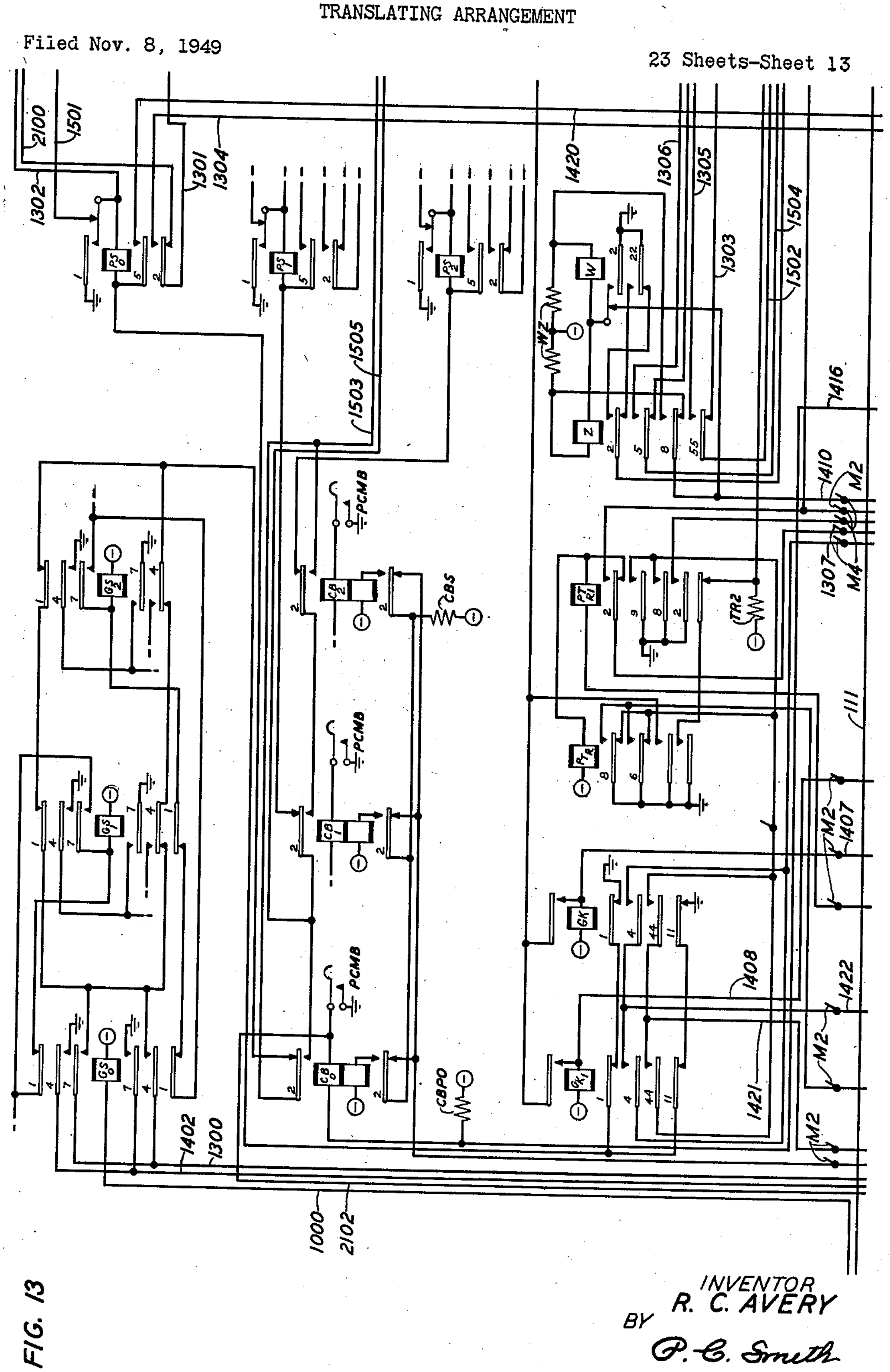
Figure 14:
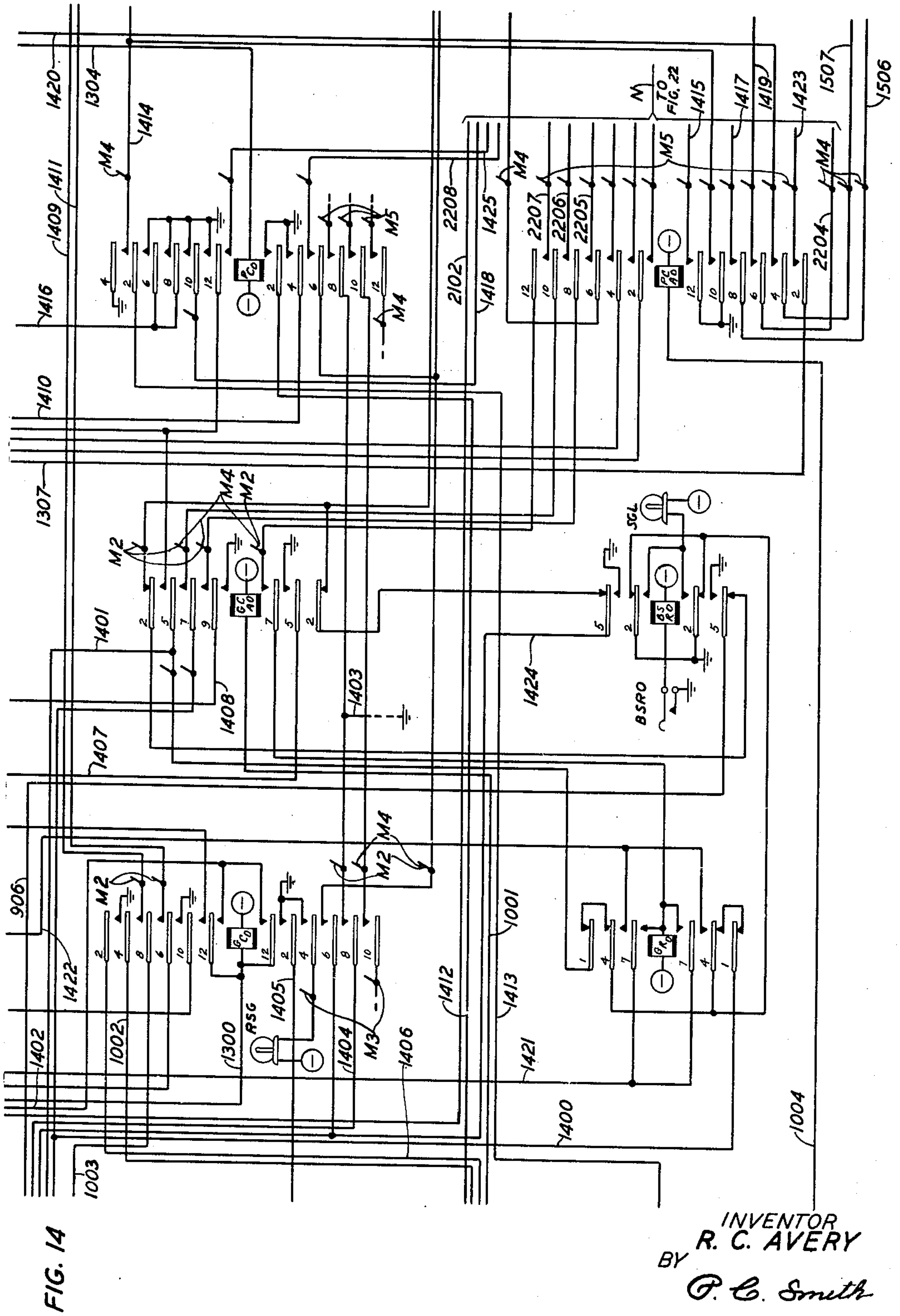
Figure 15:
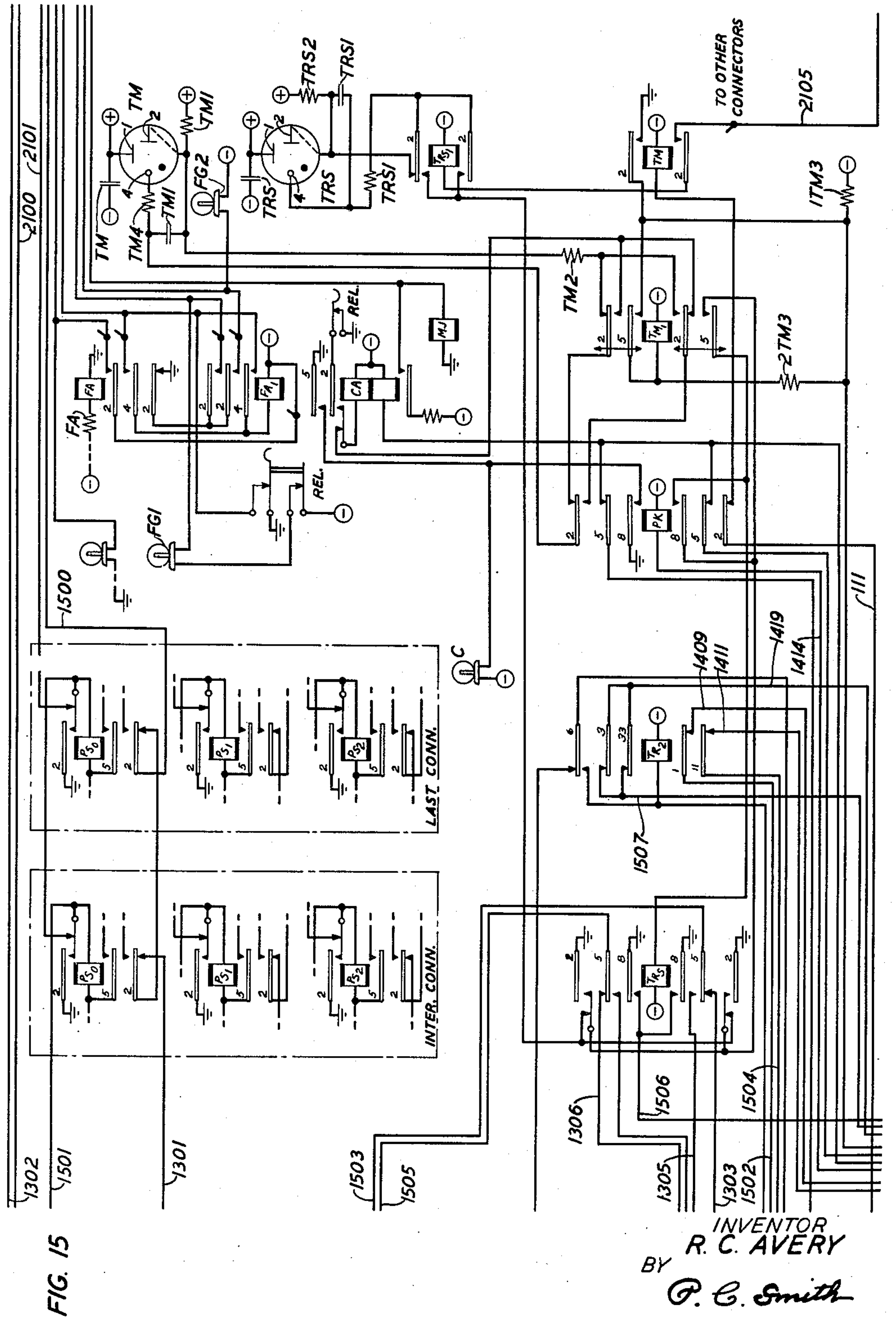

In the pretranslator connector of Figs. 9, 10, 13, 14 and 15: the lower half of Fig. 9 shows the register preference relays for a subgroup of originating registers which have access to the pretranslator connector (there can be a maximum of twenty registers in such a subgroup and a maximum of three such subgroups, to a pretranslator connector); the left part of Fig. 10 shows the register connector relays for the first originating register of the subgroup represented by the above preference relays, other register connector relays for the rest of the originating registers of the same subgroup being connectable in multiple at the multiple connections indicated at M1(10) of Fig. 10; the middle vertical portion of Fig. 10 and the left and central parts of Fig. 14 show the register subgroup connector relays for the subgroup of registers above referred to, register subgroup connector relays for other subgroups in the same pretranslator connector being connectable in multiple at the straps indicated as M2(13) and M2(14), and register subgroup connector relays for the same subgroup in other pretranslator connectors being connectable in multiple at the straps M3(14); the right-hand portions of Figs. 10 and 14 show the register subgroup pretranslator connector relays for the subgroup of registers illustrated above, other register subgroup pretranslator connector relays in the same pretranslator connector being connectable in multiple at the straps M4(10), M4(13) and M4(14), and register subgroup pretranslator connector relays for the same pretranslator in other pretranslator connectors being connectable in multiple at straps M5(10) and M5(14); the upper left portion of Fig. 13 shows the maximum of three register subgroup preference relays for each pretranslator connector; the left central part of Fig. 13 discloses the three busy relays for three pretranslators; the right portion of Fig. 13 and the upper left part of Fig. 15 show the pretranslator preference relays for three pretranslators and a group of pretranslator connectors shown as first, intermediate and last, the latter two being shown in skeleton only; the lower part of Fig. 13 and the lower and right parts of Fig. 15 show the connector controller circuit for the first pretranslator connector circuit shown in detail.

Figure 16:
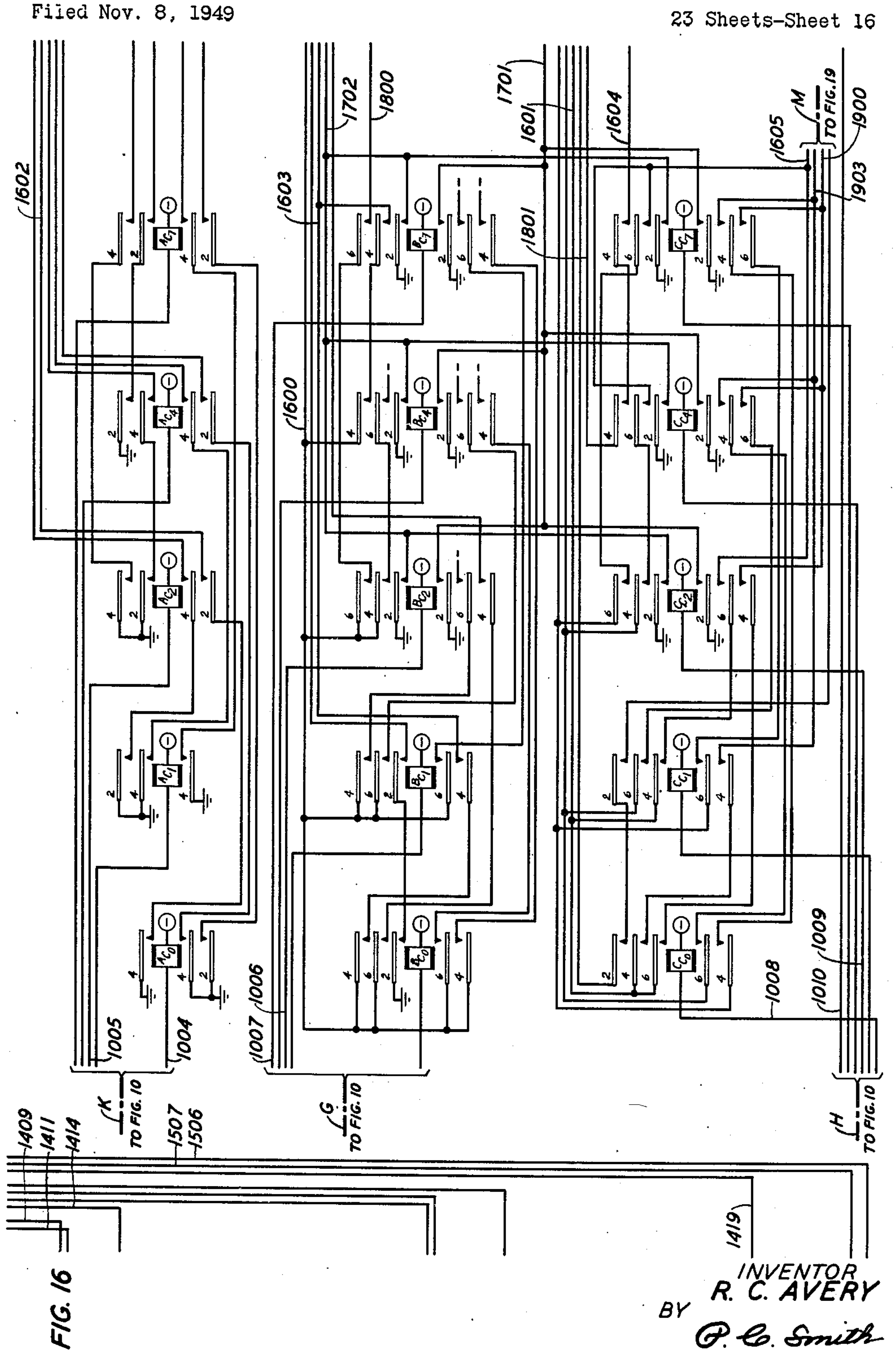
Figure 17:
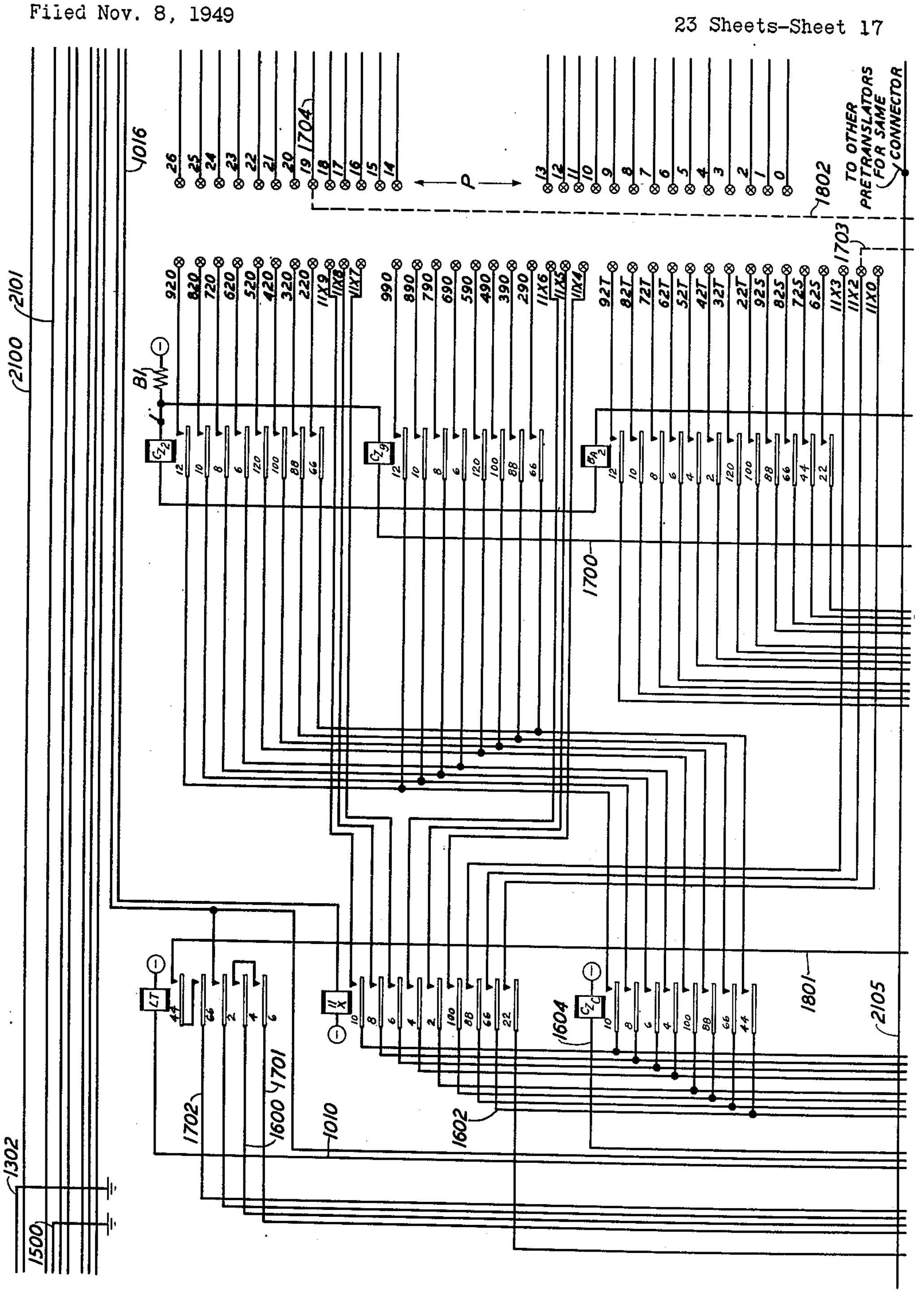
Figure 18:
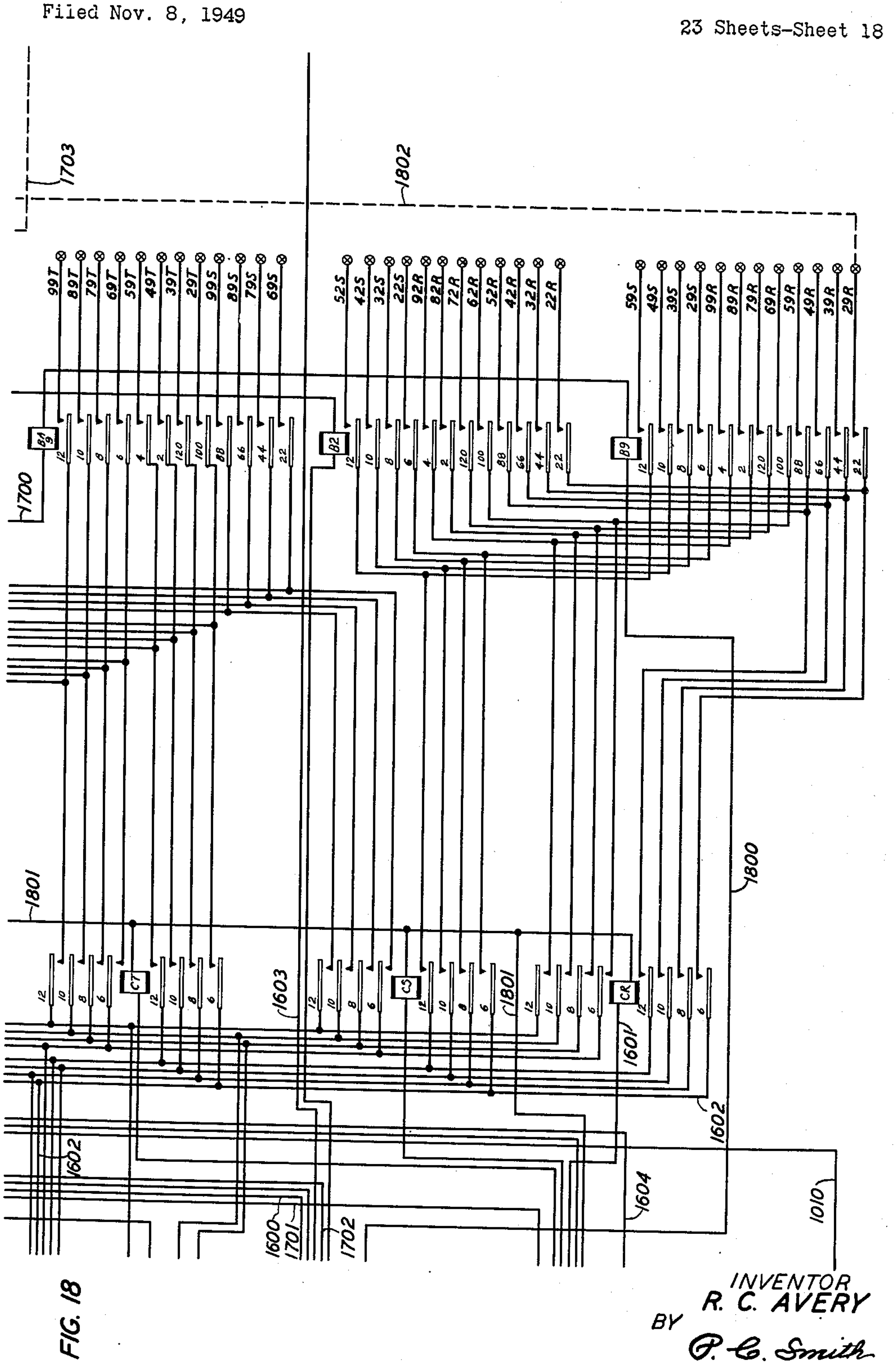
Figure 19:
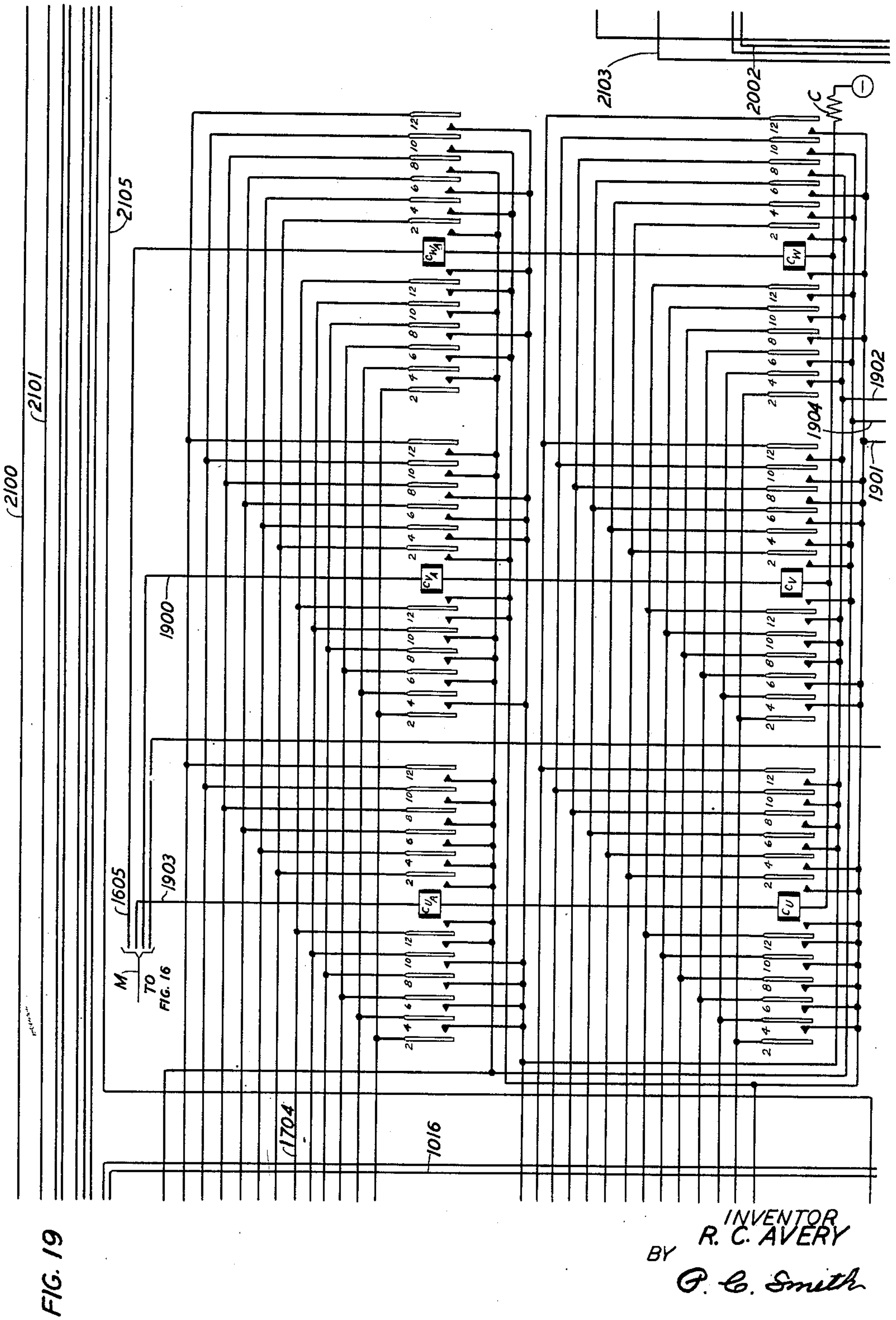
Figure 20:
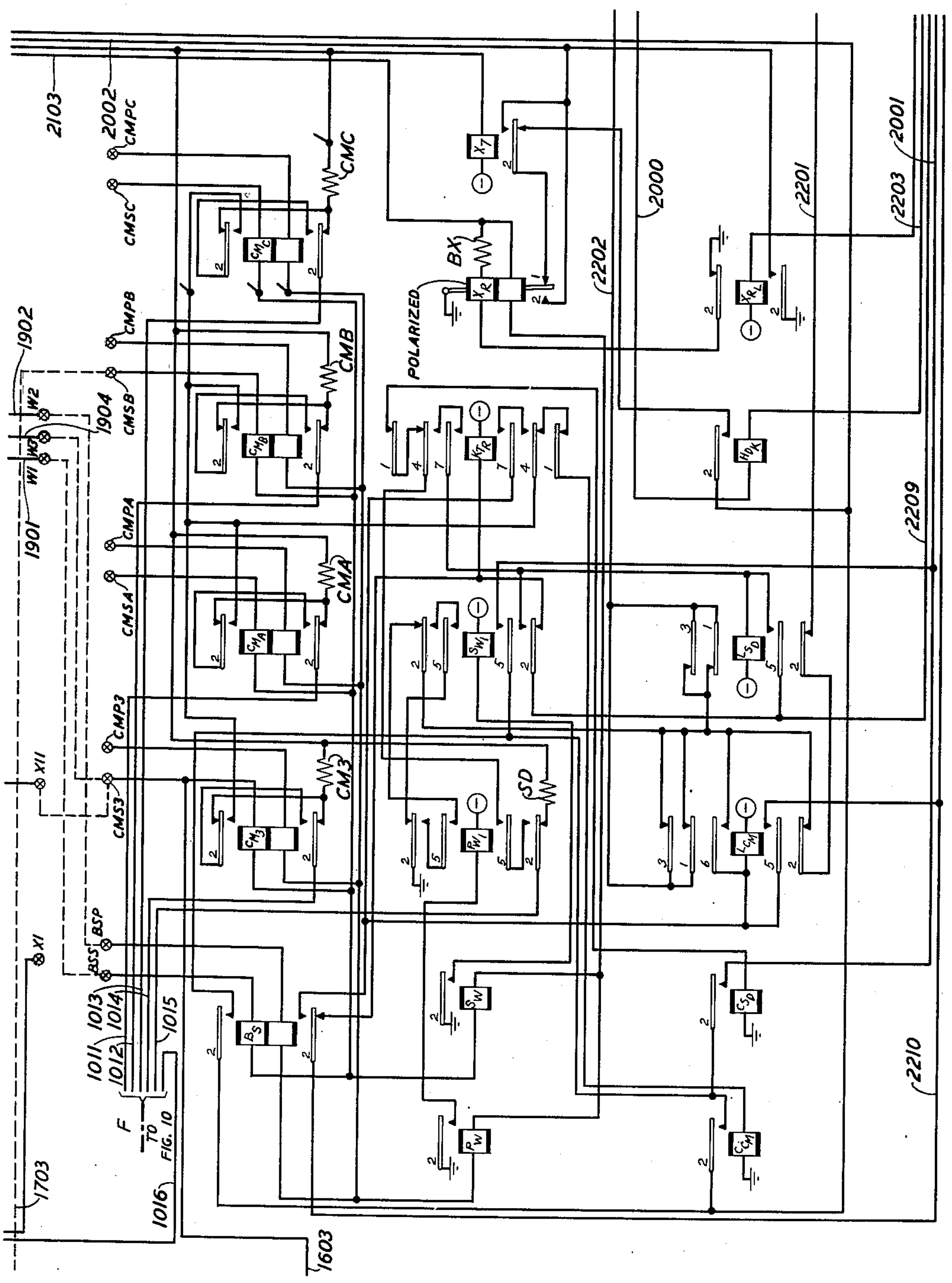
Figure 21:
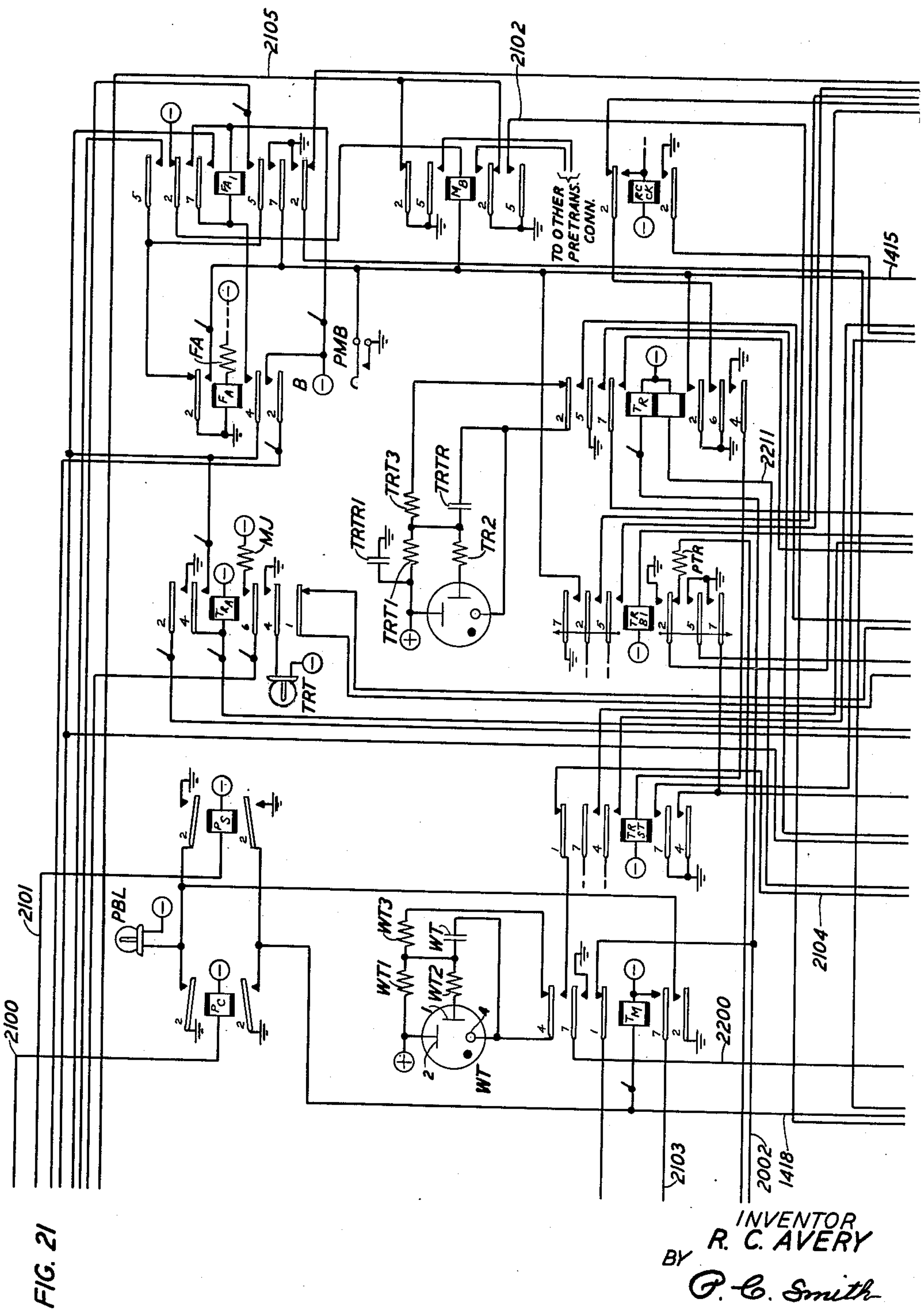

In the pretranslator circuit of Figs. 16 through 22: Fig. 16 shows the A, B and C digit registers; Figs. 17, 18 and 19 show the main part of the translating equipment of the pretranslator; and, Figs. 20, 21 and 22 show checking, timing and control circuits.

GENERAL DESCRIPTION

Reference is made to Fig. 23 of the accompanying drawings. When a subscriber, such as subscriber S(23), initiates a call, the line circuit of such subscriber terminating at a line link frame effects the seizure of an idle marker circuit through the agency of a line link marker connector. Information is transmitted to the marker as to the equipment location of subscriber S(23)'s line circuit on the line link frame and as to the class of service to which subscriber S(23) is entitled and as to the nature of the function to be performed by the marker-dial tone connection in this case. The marker tests for trunk link frames having idle originating registers terminating thereat and seizes such an idle register by means of a trunk link frame connector. The marker transmits to the register all of the aforesaid information pertaining to the subscriber S(23), interconnects subscriber S(23) with the originating register by means of the line link frame and trunk link frame, using the line link and trunk link frame connectors, and releases with such connectors after signaling the register to transmit dial tone to subscriber S(23).

When subscriber S(23) hears dial tone he begins to dial the signals indicative of the called party, whether it be a local subscriber, an operator, or a distant or foreign area subscriber to which subscriber S(23) may have direct toll dialing access.

As soon as the originating register has received and has registered three digits, exclusive of a 11 prefix, the register seizes an idle pretranslator through the agency of a pretranslator connector. The three digits, plus at times extra signals as will be described, are transmitted to the pretranslator which translates such signals into other signals which are transmitted to the register and registered therein. Such latter signals inform the originating register when to seize an idle marker for completion of the required connection. The signal might be to seize a marker after six digits are registered, or 7, or 8, or 3, etc. The pretranslator, having checked that such signals are received by the register, releases along with the pretranslator connector.

When the digit registrations in the originating register have satisfied the marker seizure requirements as obtained from the pretranslator, the register seizes an idle marker over an originating register marker connector, transmits the required registered digits and other special signals if required, to the marker along with all information pertaining to the location, class of service, etc. of subscriber S(23) and then releases.

The marker obtains access to the line circuit of subscriber S(23) through the line link frame connector, translates the called digits, and other signals, into switching directives, and follows such routing information to connect subscriber S(23) to the correct route, such as a trunk, by using the correct trunk link frame connector.

In the subsequent detailed disclosure, including the drawings, it has not been considered necessary to show details which are not new and which are not part of an intelligible disclosure of an embodiment of the present invention. Such details as are not shown or described may be found in the above-identified Busch disclosure. The latter contains in detail a full description of the above outlined system except for the pretranslator aspect thereof and except for certain alterations made in the marker translating equipment according to the present invention.

DETAILED DESCRIPTION

In the subsequent description, a typical call is picked up for discussion just prior to the time that subscriber S(23) dials the called number, all foregoing functions having no particular significance as regards the present invention.

The pretranslator embodying one variety of the present invention is rather flexible as to its functioning; however, by describing a seven-digit call (called number contains three office code digits followed by four numericals) with and without "stations delay" (a period of from 3 to 5 seconds delay after the registration of a units digit during which a party letter, if any, can be registered), a toll directing call (the office code is preceded by an 11X code where X can be any digit except one), and a vacant code call, the varieties of the invention as disclosed in the pretranslator and in the marker can be illustrated.

The following types of calls will be described in order:

1. Local seven-digit call where the called number consists of three office code digits (A, B, C) followed by four numericals (Th, H, T, U), such as 292–ThHTU;
2. Local seven-digit call with stations delay;
3. Toll call where the called number (ABC–ThHTU) is preceded by an 11X toll-directing code, where X can be any digit except one, such as 112–292–ThHTU; and,
4. Vacant code call—three digits being sufficient for seizure of the marker; and, Special types of calls, such as X11 service codes (long distance, information, etc.) and zero operator codes, will be dealt with by suitable description.

Although the present embodiment of the invention is shown in a pretranslator arranged for a three-digit office (having office codes having three digits only), such pretranslator may be modified to handle two, two and three and three-digit office codes simultaneously. Suitable description will be set forth concerning such changes.

*Three-digit local call—No party letter registering called number in originating register*

It is assumed that the originating register is connected to the line circuit of subscriber S(23) and that subscriber S(23) has heard the dial tone. Off-normal relay ON(1) has been operated in response to the taking into service of the originating register. Prior to dialing of the called number of subscriber S(23) a circuit is completed from ground, over contact 4 of relay ON(1), through circuits (not shown) indicated at D(1), over contact 2 of relay MST1(1) and conductor 100 to the dial pulse counting circuit of Fig. 2. The circuits and apparatus indicated at D(1) comprise such as will follow the dial pulses initiated by subscriber S(23) to open the above traced circuit once for each pulse of each digit. Relay AS(1) is operated in a circuit from battery, through the winding of relay AS(1), to ground in the dial pulse counting circuit over conductor 101. Relay AS(1) locks over its lower contact 6 and contact 1 of relay BS(1) to off-normal ground on conductor 102 and contact 5 of relay ON(1).

It will be assumed that subscriber S(23) dials the local called subscriber's number 292–XXXX, the thousands, hundreds, tens, and units digits not being of particular significance in regard to an understanding of the present invention. Two pulses are counted by the dial pulse counting circuit over the pulse conductor 100 and as soon as the second pulse of the first office digit is counted relay EV(1) is operated in a circuit extending from battery, through the winding of relay EV(1), contact 1 of relay OD(1), lower contact 4 of relay AS(1), to ground in the counting circuit over conductor 103. At the end of the first digit, which is two in the assumed case, the counting circuit grounds conductors 200 and 202. Such grounds are traced over upper contacts 2 and 6 of relay EV(1), upper contacts 2 and 6 of relay AS(1), conductors 104 and 105, to batteries through the windings of the A register relays A0(2) and A2(2). Relays A0(2) and A2(2) operate and lock over their upper contacts to off-normal ground on conductor 203 from contact 8 of relay ON(1).

After the registration of the A digit "two" conductors 205 and 206 are grounded by the counting circuit. Ground on conductor 205 is extended over lower contact 4 of relay EV(1), lower contact 10 of relay AS(1), to battery through the winding of relay BS(1), which relay operates and locks over its lower contact 6 and the lower contact 1 of relay CS(1), to off-normal ground on conductor 102. Ground on conductor 206 holds relay AS(1) operated in a path extending from conductor 206, over the lower contact 8 of relay EV(1), and lower contact 8 of relay AS(1). At the start of the counting of the second or B digit, ground is removed from conductors 205 and 206. Relay AS(1) releases, in turn releasing relay EV(1). Upon the release of relay EV(1), relay OD(1) operates in a circuit from battery, through the winding of relay OD(1), lower contact 1 of relay EV(1), to ground over lower contact 4 of relay BS(1). After the counting of the B digit pulses, nine in the assumed case, conductors 202 and 207 are grounded by the counting circuit. Such grounds extend over upper contacts 6 and 10 of relay OD(1), upper contacts 6 and 10 of relay BS(1), conductors 106 and 107, to batteries through the windings of B register relays B2(2) and B7(2), which relays operate and lock over their upper contacts to off-normal ground on conductor 203.

At the end of the B digit registration, the advance of the steering relay AS(1)—JS(5) continues as before, with relay CS(1) operating, relay BS(1) releasing, relay OD(1) releasing, and relay EV(1) operating. The third or C digit, two in the assumed case, is registered by means of grounds on conductors 200 and 202, over upper contacts 2 and 6 of relay EV(1), upper contacts 2 and 6 of relay CS(1), conductors 108 and 109, to batteries through the windings of C register relays C0(2) and C2(2), which relays operate and lock over their upper contacts to off-normal ground on conductor 203.

After the C digit registration, the steering relays progress as above described, relay DS(5) operating, relay CS(1) releasing, relay EV(1) releasing, and relay OD(1) operating. The thousands, hundreds, tens, and units digits, as counted by the counting circuit, are successively registered in the digit registers D(6), E(6), F(6), and G(6).

*Selection of a pretranslator*

At the time that the off-normal relay ON(1) operated, a circuit was completed for operating relay DMS(5) extending from battery, through the winding of relay DMS(5), conductor 500, upper contact 2 of relay PRL(1), to off-normal ground at contact 1 of relay ON(1) over conductor 109.

Upon the operation of steering relay DS(5), at the end of registration of the third or C digit, relay PST(1) is operated in a circuit extending from battery, through the winding of relay PST(1), conductor 110, upper contact 12 of relay DS(5), to off-normal ground on conductor 109. Relay PST(1) operates and locks over its upper contact 11 to off-normal ground on conductor 109 to start the selection of a pretranslator.

The operation of relay PST(1) connects ground over its lower contact 9, lower contact 1 of relay PRL(1), timing conductor 111, cable A to Fig. 9, conductor 111, lower contact 2 of relay PK(15), to battery through the winding of relay TM(15), which relay thereupon operates.

Relay TM(15), upon operating, operates relay TM1(15) in a circuit extending from ground, over upper contact 2 of relay TM(15), through resistance 2TM3(15), to battery through the winding of relay TM1(15), which operates and locks over its upper contact 5 to ground over upper contact 2 of relay TM(15). Relay TM1(15), upon operating, removes, at its upper back contact 2, the resistance shunt across condenser TM1(15) and completes a charging path for condenser TM1(15) extending from positive battery through resistance TM1(15), condenser TM1(15), upper back contact 2 of relay PK(15), upper front contact 2 of relay TM1(15), upper normal contacts of relay CA(15), to negative battery through the upper winding of relay CA(15). Condenser TM1(15) begins to acquire a charge and tube TM(15) will be fired by such charge if connection is not established with a pretranslator or, if such a connection is established, that it is not released within approximately one to two seconds after the connector is seized. It will be assumed that such a connection is effected and released prior to such time limits and later the effect of a delayed seizure or delayed release of a pretranslator will be described.

Relay TM (15), upon operating, completes a circuit for operating relay TRS1(15), if one or more idle pretranslators are available. If there is an idle pretranslator, as it will be assumed is the state of the pretranslator disclosed in Figs. 16 through 22, the make busy relay MB(21) of the pretranslator will be released placing ground, over upper and lower back contacts 2 of relay MB(21), conductor 2105, lower contact 2 of relay TM(15), to battery through the winding of relay TRS1(15), which relay thereupon operates. (Obviously, if there is no idle pretranslator available to this connector, conductor 2105 will not be grounded and relay TRS1(15) will not operate.) Relay TRS1(15), upon operating, removes, at its upper back contact 2, a shunt across condenser TRS1(15), and completes a charging path for condenser TRS1(15) extending from positive battery, through resistance TRS2(15), condenser TRS1(15), upper and lower front contacts 2 of relay TRS1(15), upper and lower normal contacts of relay TRS(15), lower contact 5 of relay TM1(15), to negative battery through the winding of relay TRS(15). Condenser TRS1(15) begins to acquire a charge and tube TRS(15) will be fired by such charge if connection is not established with a pretranslator within approximately one-seventh to one-third of a second after the connector is siezed. It will be assumed that such a connection is effected prior to such time limits and later the effect of a delayed seizure of a pretranslator will be described.

Relay PST(1), upon operating, completes a start circuit for operating the preference relay PRS(9) for the first originating register, assumed to be the one in use, extending from battery over lower contact 10 of relay PST(1), lower contact 3 of relay PRL(1), conductor 112, cable A to Fig. 9, conductor 112, to ground through the winding of the first relay PRS(9), which relay operates. Relay PRS(9), upon operating, completes circuits for operating the register connector relays PRA(10) and PRB(10) and the register subgroup preference relay GS0(13), such circuits extending from ground, over upper and lower back contacts 2 of relay BSRO(14), upper back contacts 4 and 1 of relay GRO(14) and conductor 1401 and in parallel over the lower back contacts 4 and 1 of relay GRO(14) and conductor 1400, over back contacts 5 and 8 of the preference relay PRS(9) for the last and intermediate registers, contacts 5 and 8 of relay PRS(9) for the first register, over conductors 900 and 901, in parallel through the windings of relays PRB(10) and PRA(10), over conductor 1000, to battery through the winding of relay GS0(13). Relays PRA(10), PRB(10), and GS0(13) thereupon operate.

Relay GS0(13), upon operating, completes a circuit for operating its associated register subgroup connector relay GCO(14), extending from ground, in parallel over lower contacts 1 and 11 of relay GK(13), lower contacts 1 and 11 of relay GK1(13), upper contacts 1 and lower back contact 4 of relay GS2(13), upper contact 1 and lower back contact 4 of relay GS1(13), upper contact 7 and lower contact 4 of relay GSO(13), conductor 1300, to battery through the winding of relay GCO(14), which relay operates and locks over its upper and lower contacts 12, conductor 1402, to ground over the upper contact 4 and lower contact 7 of relay GSO(13). Relay GCO(14), upon operating, lights lamp RSG(14), in an obvious circuit, as an indication that the associated subgroup circuit is busy. A circuit is also completed from ground, over conductor 1403, lower contact 8 of relay GCO(14), conductor 1404, upper back contacts 7 of relays PRS(9) for the last and intermediate registers, contact 7 of relay PRS(9) for the first register, to battery through lamp RG(9), which lamp lights to identify the position of the register in the subgroup.

Relay GCO(14), upon operating, operates the associated register subgroup connector relays GBO(10) and GAO(10) over circuits extending respectively from grounds, over lower and upper contacts 2 of relay GCO(14), conductors 1405 and 1406, through the windings of relays GBO(10) and GAO(10), which relays thereupon operate. Relays GBO(10) and GAO(10), upon operating, complete parallel circuits for operating register subgroup connector relay GCAO(14) extending from grounds, over lower contacts 12 of relays GBO(10) and GAO(10), conductor 1001, to battery through the winding of relay GCAO(14). Relay GCAO(14), upon operating operates relays GK(13) and GK1(13) over respective circuits extending from grounds, over lower contact 5 and upper contact 9 of relay GCAO(14) conductors 1407 and 1408, to batteries through the windings of relays GK(13) and GK1(13).

When a pretranslator is idle, its relays PC(21) and PS(21) will be operated, as shown. The operating path for relay PC(21) extends from battery, through the winding of relay PC(21), over conductor 2100, lower back contact 2 of preference relay PS0(13) for the pretranslator in the first connector, conductor 1301, lower back contacts 2 of preference relays PSO(15) for the intermediate and last connectors, conductor 1500, to ground in the pretranslator circuit. The operating circuit for relay PS(21) extends from battery, through the winding of relay PS(21), over conductor 2101, upper normal contacts of preference relays PSO(15) for the same pretranslator in the last and intermediate connectors, conductor 1501, upper normal contacts of preference relay PSO(13), conductor 1302, to ground in the pretranslator.

Upon the operation of relay GCO(14), above described, a start circuit is completed for operating the preference relay PSO(13) for the pretranslator "0," disclosed, in the first pretranslator connector circuit, disclosed. The circuit extends from battery, over the lower contact 10 of start relay PST(1), lower contact 3 of relay PRL(1), conductor 112, cable A to Fig. 9, conductor 112, through resistance STA(9), conductor 902, lower contact 12 of relay PRA(10), conductor 1002, upper contact 4 of relay GCO(14), conductor 1409, lower contact 1 of relay TR2(15), conductor 1502, lower back contact 55 of relay Z(13), conductor 1303, lower back contact 5 of relay TRS(15), conductor 1503, upper back contact 2 of relay CBO(13), (which is released indicating that pretranslator "0" is idle), through the winding of preference relay PSO(13), to ground over conductor 1302.

Relay PSO(13), upon operating, locks over its upper contact 1 and releases relays PC(21) and PS(21) of pretranslator "0," and operates the register subgroup pretranslator connector relay PCO(14) in a circuit extending from ground in the pretranslator (Fig. 17), over conductor 1500 lower back contacts 2 of preference relays PSO(15), conductor 1301, lower front contact 2 of preference relay PSO(13), conductor 1304, to battery through the winding of relay PCO(14).

Relay PCO(14), upon operating, completes, over its lower contact 4, a circuit for operating relay W(13). The circuit extends from ground, over lower contact 4 of relay PCO(14), over conductor 1410, lower normal contact of relay W(13), through the winding of relay W(13), to battery through the right half of resistance WZ(13). Relay W(13) operates and locks over its lower contact 2 to ground. The same operating ground on conductor 1410 is applied to the left side of the winding of relay Z(13) over lower back contact 8 of relay Z(13); but, relay Z(13) cannot operate because the right side of its winding is shunted to ground over lower contact 2 of relay W(13). The "WZ" relay combination is a well-known means of alternating the usage on equipment which is used on a percentage basis. When relays W(13) and Z(13) are released, as above, preference relay PSO(13) is preferred by the connector shown. When relay PCO(14) releases, indicating the release of pretranslator "0" by the connector, ground will be removed from conductor 1410, which previously operated relay W(13) and shunted relay Z(13), thereby permitting relay Z(13) to operate in parallel with relay W(13). The next time relay PCO(14) operates, or another connector relay similar thereto in the pretranslator connector, conductor 1410 will again be grounded shunting the winding of relay W(13) over the lower front contact 8 of relay Z(13), the latter remaining operated. The subsequent release of the connector relay will remove ground from conductor 1410 releasing relay Z(13). If relays Z(13) and W(13) were both operated, the above circuit for operating preference relay PSO(13) for pretranslator "0" is traced over the lower front contact 55 of relay Z(13) and conductor 1305 where it is found open at the lower front contact 5 of relay TRS(15). However, a different circuit is closed for operating relay PS1(13) extending from battery, over the lower contact 10 of relay PST(1), lower contact 3 of relay PRL(1), conductor 112, cable A to Fig. 9, conductor 112, resistance STB(9), conductor 903, lower contact 12 of relay PRB(10), conductor 1003, upper contact 8 of relay GCO(14), conductor 1411, lower contact 11 of relay TR2(15), conductor 1504, lower front contact 5 of relay Z(13), conductor 1306, upper back contact 5 of relay TRS(15), conductor 1505, upper back contact 2 of relay CB1(13) to the winding of relay PS1(13). Thus, each time the connector uses a pretranslator, it arranges that an unused one shall be first preference for the next assignment.

Relay PCO(14), upon operating, completes circuits for operating the register subgroup connector relays PBO(10) and PAO(10), extending respectively from grounds, over lower and upper contacts 2 of relay PCO(14), conductors 1412 and 1413, to batteries through the windings of relays PBO(10) and PAO(10), which relays thereupon operate. Upon the operation of either or both of relays PBO(10) and PAO(10), register subgroup pretranslator connector relay PCAO(14) operates in a circuit extending from ground over either lower contact 12 of relay PBO(10) or relay PAO(10), conductor 1004, to battery through the winding of relay PCAO(14).

Relay PCO(14) or relay PCAO(14), upon operating, operates relay PK(15) in a circuit extending from ground, over upper contact 4 of relay PCO(14) or lower contact 10 of relay PCAO(14), conductor 1414, to battery through the winding of relay PK(15). Upon the operation of relay PK(15), condenser TM1(15) is discharged in a circuit through resistance TM2(15) and over the lower front contact 2 of relay TM1(15) and upper front contact 2 of relay PK(15). The operation of relay PK(15) releases relay TM(15), which in turn releases relays TRS1(15) and TM1(15). Relay TRS1(15), upon releasing, discharges condenser TRS1(15) and stops the operation of the timer TRS(15). The release of relay TM1(15) completes a new charging path for condenser TM1(15) from positive battery, through resistance TM1(15), condenser TM1(15), upper front contact 2 of relay PK(15), lower back contact 2 of relay TM1(15), upper normal contacts of relay CA(15), to negative battery through the winding of relay CA(15). The operation of relay PK(15), therefore, stops the operation of the timer TRS(15) and recycles the timer TM(15). Relay PK(15) lights lamp C(15) in an obvious circuit to identify the connector in use.

Relay PCAO(14), upon operating, completes a circuit for operating the make busy relay MB(21) of pretranslator "0," extending from ground, over lower contact 12 of relay PCAO(14), conductor 1415, cable N to Fig. 22, conductor 1415, to battery through the winding of relay MB(21) and over upper back contact 2 of relay FA1(21), which relay MB(21) thereupon operates. Relay MB(21) applies ground, over its upper front contact 5 and lower front contact 2, to conductors leading to busy relays in other connectors. Those busy relays correspond to relay CBO(13) in the first connector. The CBO relays in all connectors will be operated to show that pretranslator "0" is busy. Relay CBO(13) has its operating circuit completed also from ground, over lower contact 5 of relay MB(21), conductor 2102, cable N to Fig. 14, conductor 2102, to battery through the winding of relay CBO(13) and resistance CBPO(13). Relay CBO(13), however, cannot operate in the first connector, as shown, because the left side of its winding is shunted by ground, over upper contacts 6 and 8 of relay PCO(14) and conductor 1416. Relay MB(21), upon operating, releases relay TRS1(15) if not already accomplished as above, thereby returning the timer TRS(15) to normal provided no other pretranslators accessible to the same connector are idle. That is, as shown by the multiple connection on conductor 2105, ground is maintained on lead 2105 by all pretranslators which are idle. Thus the relay TRS1(15) will release only if all relays corresponding to MB(21) are operated.

The pretranslator may be made to appear "busy" to all connectors by operating jack PMB(21). Furthermore, a particular pretranslator may be made to appear "busy" to a particular one or more pretranslator connectors by operating the associated jack PCMB(13) in the desired connector circuit.

*Connector time out operations*

If relay TRS1(15) is not released by the connection of a pretranslator to a pretranslator connector within about one-third of a second, condenser TRS1(15) will have acquired a charge sufficient to fire tube TRS(15) which operates relay TRS(15) in a circuit extending from negative battery, through the winding of relay TRS(15), over lower contact 5 of relay TM1(15), upper and lower normal contacts of relay TRS(15), upper and lower front contacts 2 of relay TRS1(15), resistance TRS1(15), from electrode 4 to 1 of tube TRS(15), to positive battery. Relay TRS(15) locks over contact 5 of relay TM1(15) and its own upper and lower front contacts 2 to ground. Relay TRS(15), upon operating opens at its lower back contact 5 the previously traced preference relay start conductor 1503 and at its upper front contact 5 closes the alternate start conductor 1505 to permit the connector circuit to try to connect with another pretranslator.

If a pretranslator is connected as a result of the above transfer time-out, relay TRS(15), at its upper and lower contacts 8, applies ground to conductor 1506, lower contact 8 of relay PCAO(14), and over conductor 1417, through cable N to Fig. 22, to the pretranslator, where signal is provided which effects the calling in of a trouble recorder to record facts concerning the transfer time-out. Upon the subsequent operation of relay PK(15), above described, relay TRS(15) locks over the lower contact 8 of relay PK(15), before relay TM1(15) releases.

If relay PK(15) is not operated, indicating connection to a pretranslator as above described, before the lapse of two seconds after a connector is seized, condenser TM1(15) will accumulate a charge sufficient to fire tube TM(15) and operate relay CA(15) in the previously traced circuit including the discharge across electrodes 4 and 1 of tube TM(15). Relay CA(15), upon operating, locks through its upper winding to ground over its upper front contact 2 and release key REL(15), lights lamp C(15) in an obvious circuit, and, over its lower contact, operates a device MJ(15) which signals a major alarm. Relay CA(15) may be released by opening key REL(15). If, as above described, relay PK(15) is operated and relay TM1(15) is released indicating that a pretranslator has been connected, the timer TM(15) is recycled; but, subsequent thereto if the pretranslator is not released before the lapse of about two seconds, thereby not releasing relay PK(15) as will be explained, tube TM(15) fires and operates relay CA(15).

In regard to the above time-out periods, it will be assumed that a pretranslator is seized before the lapse of one-third of a second, thereby precluding the firing of either tube on the connection phase of the circuit operation.

If, as assumed, the pretranslator is seized prior to the transfer time-out period (up to one-third of a second) relay MB(21) will be operated, as above, releasing relay TRS1(15), if not already released as above, thereby discharging condenser TRS1(15) and returning the timer TRS(15) to normal provided no other pretranslators associable with the same connector are idle, as above discussed; and relay PK(15) will be operated releasing relay TM(15) to recycle the timer TM(15) to time the duration necessary for the seized pretranslator to perform its functions and release in a maximum of about two seconds.

*Pretranslator functions*

It will be recalled that when the pretranslator was seized, by the operation of relay PS0(13), relays PC(21) and PS(21) in the pretranslator were released. The release of either lights lamp PBL(21), in an obvious circuit, thereby indicating that pretranslator "0" is busy. Either of relays PC(21) or PS(21) or both, when released, complete an obvious circuit for operating relay TM(21). Another operating ground for relay TM(21) is provided over upper contact 10 of relay PCO(14), conductor 1418, cable N to Fig. 22, conductor 1418, to battery through the winding of relay TM(21). Relay TM(21), upon operating, adds an additional ground to the circuit of lamp PBL(21) over its lower contact 2, completes a bias circuit through the upper winding of relay XR(20), and starts the timer WT(21) functioning. The bias circuit for the polarized relay XR(20) is traced from battery, over lower contact 7 of relay TM(21), conductor 2103, resistance BX(20), upper winding of relay XR(20), to ground over upper contact 2 of relay XRL(20). The current through the upper winding of relay XR(20) does not operate relay XR(20); relay XR(20) will not operate until sufficient current flows through its lower winding, as will be explained more fully hereinafter. Relay TM(21), upon operating, removes, at its upper back contact 4, the shunt across condenser WT(21) and completes a charging circuit for condenser WT(21) from positive battery through resistance WT1(21), condenser WT(21), upper front contact 4 of relay TM(21), upper contact 1 of relay TRST, conductor 2104, lower normal contact of relay WT(22), winding of relay WT(22), conductor 2200, to ground over upper contact 7 of relay TM(21). On properly completed usage of the pretranslator the work timer WT(21) will be recycled. If the pretranslator is not released within about two-fifths of a second, tube WT(21) will fire operating relay WT(22) to initiate the taking of a trouble record. It will be assumed for present purposes that no such trouble is encountered.

*Transmitting office code to pretranslator*

Upon the operation of the connector relays PRA(10), PRB(10), GAO(10), GBO(10), PAO(10), and PBO(10), as above described, the information registered in the A, B, and C digit registers of Fig. 2 (originating register) is transmitted to the A, B, and C digit registers of Fig. 16 (pretranslator). Ground is applied from off-normal ground on conductor 203, over the upper contacts of relays A0(2) and A2(2), to respective conductors 104 and 105, cable E to Fig. 10, conductors 104 and 105, lower contacts 2 and 6 of relay PRA(10), lower contacts 2 and 6 of relay GAO(10), lower contacts 2 and 6 of relay PAO(10), conductors 1004 and 1005, cable K to Fig. 16, conductors 1004 and 1005, to batteries through the windings of respective relays AC0(16) and AC2(16), which relays thereupon operate. Off-normal ground on conductor 203 is applied over the upper contacts of relays B2(2) and B7(2) to conductors 106 and 107, cable C to Fig. 10, conductors 106 and 107, lower contacts 6 and 10 of relays PRB(10), GBO(10), and PBO(10), conductors 1006 and 1007, cable G to Fig. 16, conductors 1006 and 1007, to batteries through the windings of respective relays BC2(16) and BC7(16), which relays thereupon operate. Off-normal ground on conductor 203 is also extended over the upper contacts of relays C0(2) and C2(2), to conductors 108 and 109, cable D to Fig. 10, conductors 108 and 109, upper contacts 2 and 6 of relays PRA(10), GAO(10), and PAO(10), conductors 1008 and 1009, cable H to Fig. 16, conductors 1008 and 1009, to batteries through the windings of respective relays CC0(16) and CC2(16), which relays thereupon operate.

Relay LT(17) in the pretranslator is operated to indicate that this code is a local code. The circuit for operating relay LT(17) extends from ground, over upper back contact 5 of relay 11D(9) of the originating register, conductor 904, upper contact 12 of relays PRA(10), GAO(10), and PAO(10), conductor 1010, cable H to Fig. 16, conductor 1010, to battery through the winding of relay LT(17).

Since the BC(16) register records the digit 9, relays CZ9(17), BA9(18), and B9(18) will operate in a circuit extending from battery, through resistance B1(17), through the winding of relay CZ9(17), conductor 1790, winding of relay BA9(18), winding of relay B9(18), conductor 1809, upper contacts 6 of relays BC7(16) and BC2(16), conductor 1600, lower contacts 4 and 6 of relay LT(17), conductor 1791, to ground over lower contact 2 of relay BC7(16), BC2(16), or CC2(16).

Since the CC(16) register records the digit 2, relays CV(19), CVA(19), and CR(18) will operate in a circuit extending from battery, through resistance C(19), through the windings of relays CV(19) and CVA(19), conductor 1900, cable M to Fig. 16, conductor 1900, lower contact 4 of relay CC2(16), upper contact 6 of relay CC0(16), conductor 1601, winding of relay CR(18), conductor 1801, lower contacts 44 and 66 of relay LT(17), conductor 1702, to ground over upper contact 2 of relay BC7(16) or BC2(16) or CC2(16).

Since the AC(16) register records the digit 2, ground is extended over upper contact 4 of relay AC0(16), lower contact 2 of relay AC2(16), conductor 1602, lower contact 6 of relay CR(18), lower contact 22 of relay B9(18), to punching "29R."

*The translation*

Relays CZ2(17) and CZ9(17) represent eight such relays from CZ2 to CZ9; relays BA2(17) and BA9(18), as well as relays B2(18) and B9(18), also represent two groups of eight relays each. Each of these relays having the same number, say 9, are operated in series if the B digit registered is 9, etc. Thus only those punchings 29R to 99R, 29S to 99S, and 29T to 99T, having a B digit of 9 can be energized. Of those 24 punchings only those having the registered A digit value, say 2, can be energized, such as 29R, 29S, and 29T. The R will be energized if the C digit is 1, 2, or 3; S will be energized if the C digit is 4, 5, or 6; and T will be energized if the C digit is 7, 8, or 9. Thus each R, S, or T punching represents three different codes, differing only by the value of the C digit.

If the value of the C digit is zero, then relay CZC(17) would be operated and relays CR(18), CS(18), and CT(18) released, thereby energizing one of the punchings 220—920, 290—990 depending upon the values of the A and B digits. This will be more fully explained later.

If, as will be explained in more detail hereinafter, the call were an 11X, or toll directing code type, rather than a local call, relay 11X(17) would operate instead of relay LT(17), thereby energizing one of the punchings 11X0, 11X2—11X9, depending upon the value of the digit registered in the AC register of Fig. 16.

The three relays CR(18), CS(18), and CT(18) are operated one at a time selectively depending upon whether the digit registered in the CC(16) registers of Fig. 16 is respectively 1 to 3, 4 to 6, or 7 to 9.

The three relays CU(19), CV(19), and CW(19), along with their respective auxiliary relays CUA(19), CVA(19), and CWA(19), are operated one at a time selectively depending upon whether the digit registered in the CC(16) registers of Fig. 16 is respectively 1 or 4 or 7, 2 or 5 or 8, or 3 or 6 or 9.

Thus the operation of a relay of the group CR(18), CS(18) and CT(18) determines whether an R or an S or a T punching will be energized and the operation of a relay of the group CU(19), CV(19), and CW(19) with their auxiliary relays determines which one of the three codes represented by that punching requires translation.

The translation of a code, such as the assumed code 292, into information to be transmitted to the originating register as to when the latter should seize a marker is represented by three punchings W1(20), W2(20), and W3(20). These punchings are selectively grounded by the R, S, or T punchings according to which of the switching relays of Fig. 19 are operated. Punching W1(20) represents what may be called the "basic setting," meaning, for the assumed case of a basic seven-digit home or local area code, that the register should seize a marker after seven digits have been registered therein. Punching W2(20) represents the "basic setting" plus "stations delay," or, in other words, the register should wait until seven digits have been registered and then wait for a period of from three to five seconds before seizing a marker in order to give ample time for registration of a party letter if such should be forthcoming. The punching W3(20) represents a condition whereunder the register should seize a marker after three digits have been registered.

It will now be apparent that any R or S or T punching, which represents three codes having the same A and B digits but different C digits, should be arranged to energize any one of the punchings W1(20), W2(20), or W3(20) depending upon the value of the C digit of the code. In the assumed case of the code 292, punching 29R is energized. Punching 29R can represent codes 291, 292, and 293. The first code, having a C digit of 1, might require a W1(20) translation; the second code, having a C digit of 2, might also require a W1(20) translation; and, the third code, having a C digit of 3, might also require a W1(20) translation. On the other hand the respective translations required might be W1(20), W1(20), and W2(20), etc. It will be seen by simple calculation that the single punching 29R can represent 27 different combinations of translations. 27 punchings, collectively designated P on Fig. 17, are provided and are numbered P0(17) to P26(17). Each P punching represents one of the possible 27 combinations of translations applicable to punching 29R, as well as to each of the other R, S and T punchings. Of these 27 punchings, three do not require action by the switching relays of Fig. 19 because those three do not depend upon the value of the C digit for translation. For example, punching P26(17) represents the condition where all codes cross-connected thereto require W3(20) translation, punching P13(17) requires only W2(20) translation, and punching P0(17) requires only W1(20) translation.

It will be assumed that the code 292 requires the translation, "basic setting," or the W1(20) punching energized and that code 291 requires W3(20) translation and that code 293 requires W2(20) translation. Under those assumed circumstances, the punching 29R, which represents these three codes, must be cross-connected, as shown, to punching P19(17). The table below shows how the P punchings are to be cross-connected for various codes:

| "P" Punchings | "W" Punchings | | | Number of Digits Expected—3-Digit Home Area Code | | |
|---|---|---|---|---|---|---|
| | 1st Code (C Digit 1, 4, or 7) | 2nd Code (C Digit 2, 5, or 8) | 3rd Code (C Digit 3, 6, or 9) | 1st Code | 2nd Code | 3rd Code |
| 0 | 1 | 1 | 1 | 7 | 7 | 7 |
| 1 | 1 | 1 | 2 | 7 | 7 | 7 or 8 |
| 2 | 1 | 1 | 3 | 7 | 7 | 3 |
| 3 | 1 | 2 | 1 | 7 | 7 or 8 | 7 |
| 4 | 1 | 2 | 2 | 7 | 7 or 8 | 7 or 8 |
| 5 | 1 | 2 | 3 | 7 | 7 or 8 | 3 |
| 6 | 1 | 3 | 1 | 7 | 3 | 7 |
| 7 | 1 | 3 | 2 | 7 | 3 | 7 or 8 |
| 8 | 1 | 3 | 3 | 7 | 3 | 3 |
| 9 | 2 | 1 | 1 | 7 or 8 | 7 | 7 |
| 10 | 2 | 1 | 2 | 7 or 8 | 7 | 7 or 8 |
| 11 | 2 | 1 | 3 | 7 or 8 | 7 | 3 |
| 12 | 2 | 2 | 1 | 7 or 8 | 7 or 8 | 7 |
| 13 | 2 | 2 | 2 | 7 or 8 | 7 or 8 | 7 or 8 |
| 14 | 2 | 2 | 3 | 7 or 8 | 7 or 8 | 3 |
| 15 | 2 | 3 | 1 | 7 or 8 | 3 | 7 |
| 16 | 2 | 3 | 2 | 7 or 8 | 3 | 7 or 8 |
| 17 | 2 | 3 | 3 | 7 or 8 | 3 | 3 |
| 18 | 3 | 1 | 1 | 3 | 7 | 7 |
| 19 | 3 | 1 | 2 | 3 | 7 | 7 or 8 |
| 20 | 3 | 1 | 3 | 3 | 7 | 3 |
| 21 | 3 | 2 | 1 | 3 | 7 or 8 | 7 |
| 22 | 3 | 2 | 2 | 3 | 7 or 8 | 7 or 8 |
| 23 | 3 | 2 | 3 | 3 | 7 or 8 | 3 |
| 24 | 3 | 3 | 1 | 3 | 3 | 7 |
| 25 | 3 | 3 | 2 | 3 | 3 | 7 or 8 |
| 26 | 3 | 3 | 3 | 3 | 3 | 3 |

In the above example, punching 29R(18) was interconnected with punching P19(17) in order to satisfy the above table to the effect that the first code (291) could get a W3(20) translation, the second code (292), a W1(20) translation, and the third code (293), a W2(20) translation. If at any time one or more of the three codes represented by punching 29R is changed as to its translation requirements, say the second code (292) is changed to require a W3(20) translation, then the cross-connection is merely switched from punching P19(17) to P25(17), as will be apparent from the above table.

With punching 29R(18) grounded and relay CVA(19) operated, punching W1(20) will be grounded over cross-connection 1802, punching P19(17), conductor 1704, left contact 12 of relay CVA(19), and conductor 1901 to punching W1(20). Punching W1(20) is cross-connected to punching BSS(20), which latter punching, when grounded, as will be apparent presently, will inform the originating register to seize a marker after seven digits have been registered.

If punching W2(20) should be grounded, by virtue of a code translation, then punching BSP(20) will be grounded, which latter punching, when grounded, as will be apparent from subsequent description, will inform the originating register to seize a marker after seven digits have been registered, plus a three-to-five seconds delay.

The W3(20) punching, as arranged, will ground punching CMS3(20), which will inform the register to seize a marker after three digits have been registered.

The remaining punchings, CMP3(20), CMSA(20), CMPA(20), CMSB(20), CMPB(20), CMSC(20), and CMPC(20) are used as follows: punching CMP3(20) signals the register to seize a marker after three digits have been registered but before doing so to return the coin on coin lines, when the latter are used; punchings CMSA(20), CMSB(20), and CMSC(20) may be used to represent any number of digits without stations delay, depending upon how certain cross-connections are made in the originating register, as will be explained in connection with Fig. 5; and, punchings CMPA(20), CMPB(20), and CMPC(20) represent the same translation as the corresponding "S" punchings with the addition of the stations delay time feature.

It will be readily appreciated that in an exclusively two-digit home or local office code area the R, S and T punchings of Figs. 17 and 18 will have no significance as far as the suffix letter is concerned because no C digit is involved; i. e., punching 29R(18) means office code 29 only, etc. Under such circumstances the BSS(20) punching represents a "basic setting" of six digits instead of the assumed case of seven digits. The seven-digit situation has been chosen to illustrate the embodiment of the invention which may be termed "translation by combinations," three codes taken three at a time giving 27 different combinations as above described as illustrative.

It will be further apparent that the invention may be applied to a combined two- and three-digit home area. In the two-digit case where the two-digit code can be identified by the first two digits, the punchings of Figs. 17 and 18 which represent the two-digit codes would be cross-connected directly to a CMS—(20) or CMP—(20) punchings, say punchings CMSA(20) or CMPA(20), because the translating arrangement of Fig. 19 affords none of the advantages it does in regard to three-digit translation as above described. Such punchings would include the ones having "0" as the C digit. For two-digit offices which cannot be identified as such by the first two digits and for three-digit offices, the R, S, and T punchings will be cross-connected to the P punchings. In such a case, any two-digit office where the thousands digit (which would be registered in the C register of the originating register) would conflict with a three-digit office code must be arranged not to have any thousands digit of that value.

*X11 codes*

In any type of office, X11 codes (211, 311, etc.) may be used as service codes (information, long distance, etc.) as previously explained. In two-digit offices punching X1(20) represents all X11 codes; in two-three and three-digit offices punching X11(20) is used. In either case, the X1(20) or X11(20) punching is cross-connected to punching CMP3(20) if the originating register is to return the coin on coin lines before seizing a marker or to punching CMS3(20), as illustrated, if the coin feature is not involved.

*B digit 1 or zero*

All codes having a B digit of 1 or zero, except X11 codes, are treated as vacant codes without cross-connection. The instruction to the originating register under such circumstances will be to seize a marker after three digits; i. e., grounding of the punching CMS3(20). Any code having a B digit of zero will operate relays BC4(16) and BC7(16). A circuit is completed from ground, over lower contact 2 of relay BC4(16) or BC7(16), conductor 1701, lower contacts 6 and 4 of relay LT(17) (operated as above described), conductor 1600, upper contact 4 of relay BC4(16), upper contact 4 of relay BC7(16), conductor 1603, directly to punching CMS3(20). Any code having a B digit of 1, with a C digit other than 1 (to distinguish from X11 codes) will operate relays BC0(16), and BC1(16) and at least one of relays CC2(16), CC4(16), or CC7(16). A circuit will be completed from ground, over lower contact 2 of one of relays CC2(16), CC4(16), or CC7(16), conductor 1701, lower contacts 6 and 4 of relay LT(17), conductor 1600, upper contact 4 of relay BC0(16), lower contact 4 of relay BC1(16), conductor 1603, directly to punching CMS3(20), as above.

*11X directing codes*

When 11X directing codes are to be translated (where X can be any digit other than 1), as will be more fully explained later, relay 11X(17) operates instead of relay LT(17). The 11 prefix is absorbed in the originating register circuit shown in Fig. 9 and the X digit is registered in the A digit register of Fig. 2. Only one of the punchings 11X0, 11X2 to 11X9 of Fig. 17 will be grounded and such punching will be directly cross-connected to a punching BS—(20) or CM—(20) as required.

*Zero operator codes*

As indicated previously, an initial digit of zero may be dialed by the calling subscriber. In such a case, as is fully described in the Busch disclosure, the dial pulse counting circuit in Fig. 2 completes a circuit from ground (not shown), over conductor 208, upper contact 11 of relay AS(1) (operated in readiness for steering the first registered digit to the register of Fig. 2), to battery through the winding of the marker seizure start relay MST(1), which, when operated, as also described by Busch, causes the seizure of an idle marker circuit.

*Transmitting translated directive to originating register*

It will be recalled that in response to the registration of the seven-digit home area office code 292, punching 29R(18) was grounded, which in turn, through the agency of cross-connection 1802 to punching P19(17) and the switching relay CVA(19); grounded punchings W1(20) and BSS(20), indicative of a so-called "basic setting," or a directive to seize an idle marker after the registration of seven digits.

Ground on punching BSS(20) operates relays BS(20) and SW(20) in a circuit extending from ground on punching BSS(20), through the upper winding of relay BS(20), through the winding of relay SW(20), lower winding of relay XR(20), conductor 2103, to battery over the lower contact 7 of relay TH(21). Relay SW(20), upon operating, operates relay SW1(20) in an obvious circuit.

The originating register has, as shown in Fig. 5, five relays CMA(5), CMB(5), CMC(5), CM3(5), SD(5) operated respectively by grounds on conductors 501, 502, 503, 504, and 505, over cable B to Fig. 10, conductors 501 to 505, upper contacts 6, 8, 10, 4, and 2 of relays PRB(10), GBO(10), and PBO(10), conductors 1011 to 1015 respectively, cable F to Fig. 20, conductors 1011 to 1015, to lower contacts 2 of respective relays CMA(20), CMB(20), CMC(20), or CM3(20), and PW1(20). Upon the operation of any of relays CMA(20), CMB(20), CMC(20), or CM3(20), the above circuits for the corresponding conductors 1011, 1012, 1013, and 1014 are completed over the lower and upper front contact 2 of the associated relays, lower back contacts 4 and 1 of relay KTR(20), to ground through the winding of relay CCM(20). Upon the operation of relay PW1(20), the conductor 1015 is completed over the lower front contacts 2 and 5 of relay PW1(20), upper back contacts 4 and 1 of relay KTR(20), to ground through the winding of relay CSD(20). Under the assumed circumstances, relay SW1(20), operated, none of the above relays are operated and none of the conductors 1011 to 1015 are completed to ground. Thus none of the originating register relays CMA(5), CMB(5), CMC(5), CM3(5), and SD(5) will be operated.

Relay SW1(20), upon operating, completes a circuit for operating relay HD(22) extending from battery, through the winding of relay HD(22), conductor 2201, lower contacts 2 of relays LSD(20) and LCM(20), upper front contacts 2 and 5 of relay SW1(20), to ground over upper back contact 2 of relay PW1(20). Relay HD(22) operates and locks over its upper contact 12 and lower contact 11, conductor 2202, upper contacts 3 and 1 of relays LSD(20) and LCM(20), upper front contacts 2 and 5 of relay SW1(20), to ground over upper back contact 2 of relay PW1(20).

Relay HD(22), upon operating, provides a battery circuit for locking the operated pretranslator start relay PS0(13) and the preference relay PRS(9) for the first originating register in the connector circuit. Such circuit extends from battery, through lamp HD(22), upper contact 2 of relay TRL(22), conductor 2203, winding of relay HDK(20), conductor 2000, upper contact 2 of relay HD(22), conductor 2204, cable N to Fig. 14, conductor 2204, lower contact 6 of relay PCAO(14), conductor 1419, upper contacts 3 and 33 of relay $TR_2$(15), conductor 1507, lower contact 4 of relay PCAO(14), conductor 1420, lower contact 5 of relay PS0(13), to ground over upper contact 1 of relay PS0(13). This battery may be traced over a previously traced circuit to ground through the winding of relay PRS(9) through the resistance STA(9). Relay HDK(20) operates over this locking path for relay PS0(13).

Relay HD(22), upon operating, provides locking grounds for relays PRA(10), PRB(10), and GS0(13), extending from grounds over the lower contacts 6 and 4 and the upper contacts 7 and 5 of relay HD(22), lower contacts 2 and 5 of relay TRL(22), conductors 2205 and 2206, cable N to Fig. 14, conductors 2205 and 2206, upper contacts 8 and 10 of relay PCAO(14), upper contacts 7 and 5 of relay GCAO(14), conductors 1400 and 1401, lower back contacts 8 and 5 of relays PRS(9) for the last and intermediate originating registers, lower contacts 8 and 5 of relay PRS(9) for the first register, conductors 901 and 900, through the windings of relays PRA(10) and PRB(10), conductor 1000, to battery through the winding of relay GS0(13).

Relay HD(22), upon operating, also closes a circuit for operating relay GRO(14) of the connector circuit extending from ground, over lower contacts 6 and 2 of relay HD(22), upper contact 1 of relay TRB(22), conductor 2207, cable N to Fig. 14, conductor 2207, upper contact 12 of relay PCAO(14), lower contact 7 of relay GCAO(14), to battery through the winding of relay GRO(14), which relay operates and locks over its upper and lower contacts 7, conductor 1421, lower contacts 44 of relays GK(13) and GK1(13), to ground over lower back contacts 6 and 8 of relay PTR(13). Relay GRO(14), upon operating, completes a circuit for operating relay PCK(22) of the pretranslator, as an indication that all of the required control relays of the connector have operated, extending from ground, over upper and lower back contacts 2 of relay BSRO(14), upper and lower front contacts 4 of relay GRO(14), conductor 1422, lower contacts 4 of relays GK(13) and GK1(13), conductor 1307, lower contact 2 of relay PCAO(14), conductor 1423, cable N to Fig. 22, conductor 1423, to battery through the winding of relay PCK(22), which relay thereupon operates.

*Release of pretranslator and pretranslator connector*

Upon the operation of relay HDK(20) in the pretranslator, as above described, a circuit is completed for operating relay PRL(1) of the register circuit, extending from ground, over contact 1 of relay XR(20), back contact 2 of relay XT(20), contact 2 of relay HDK(20), upper contact 2 of relay BS(20), lower contact 5 of relay SW1(20), conductor 2001, lower front contact 8 of relay HD(22), upper back contact 9 of relay RLK(22), upper back contact 8 of relay WT(22), upper back contact 5 of relay TRTR(22), conductor 2208, cable N to Fig. 14, conductor 2208, lower contact 6 of relay PCO(14), lower contact 6 of relay GCO(14), conductor 1424, lower back contacts 2 of relays PRS(9) for the last and intermediate registers, lower front contact 2 of relay PRS(9) for the first register, conductor 905, cable A to Fig. 1, conductor 905, to battery through the lower winding of relay PRL(1). Relay PRL(1) operates and locks over its upper contact 5 and lower contact 7, to grounds over lower contacts 7 and 2 of relay PST(1).

Relay PRL(1), upon operating, releases relay DMS(5), which is slow to release to insure that the pretranslator releases before the register seizes a marker, and applies ground over its lower contact 6 to conductor 113 to lock operated any of the relays CMA(5), CMB(5), CMC(5), CM3(5), and SD(5), which may have been operated by the pretranslator, none of which are operated in the assumed case.

Relay PRL(1), upon operating, operates relay RLK(22) in the pretranslator in a circuit extending from ground, over lower contact 7 of relay PST(1), upper contact 5 of relay PRL(1), conductor 114, cable A to Fig. 9, conductor 114, upper contact 10 of relay PRS(9) for the first register, upper back contacts 10 of relays PRS(9) for the intermediate and last registers, conductor 906, lower back contact 5 of relay BSRO(14), upper front contact 2 of relay GCAO(14), upper front contact 12 of relay PCO(14), conductor 1425, cable N to Fig. 22, conductor 1425, upper back contact 8 of relay TRTR(22), upper normal contact of relay RLK(22), upper back contact 6 of relay TRB(22), lower and upper front contacts 2 of relay PCK(22), to battery through the winding of relay RLK(22), which operates and locks to its operating ground over its upper front contact 2, and upper back contact 8 of relay TRTR(22), to conductor 1425. Relay RLK(22) also locks over its upper front contact 9, upper back contact 8 of relay WT(22), upper back contact 5 of relay TRTR(22), conductor 2208, cable N to Fig. 14, conductor 2208, lower contact 6 of relay PCO(14), lower contact 6 of relay GCO(14), conductor 1424, lower back contacts 2 of relays PRS—(9) (last and intermediate), lower contact 2 of relay PRS(9) (first), conductor 905, cable A to Fig. 1, conductor 905 to ground over lower contact 7 of relay PRL(1) and lower contact 2 of relay PST(1).

Relay RLK(22), upon operating, extends a locking ground for relay TM(21), over upper contact 12 and lower contact 11 of relay RLK(22), to conductor 1418 to hold relay TM(21) operated. Relay RLK(22), operated, operates relays LSD(20) and LCM(20). The circuit for operating relay LSD(20) extends from ground, over upper contacts 7 and 5 of relay RLK(22), conductor 2209, lower front contact 2 of relay SW1(20), to battery through the winding of relay LSD(20), which locks over its lower contact 5 to its operating ground independently of relay SW1(20). The circuit for operating relay LCM(20) extends from ground, over lower contacts 6 and 4 of relay RLK(22), conductor 2210, lower front contact 2 of relay BS(20), to battery through the winding of relay LCM(20), which locks to its operating ground over its lower contact 5 independently of relay BS(20), and locks over its upper contact 6, upper front contacts 2 and 5 of relay SW1(20), to ground over upper back contact 2 of relay PW1(20).

*Connector release*

The operation of relays LCM(20) and LSD(20) releases relay HD(22). Relay HD(22), upon releasing, releases relay HDK(20) in the pretranslator and releases relays PS0(13) and PRS(9) in the connector circuit.

The release of relay PS0(13) reoperates, over previously traced circuits, relays PS(21) and PC(21) in the pretranslator and releases relay PCO(14). Relay PCO(14), upon releasing, releases relays PAO(10) and PBO(10), thereby releasing relay PCAO(14) which in turn releases relay PK(15). Relay PK(15), upon releasing, closes, over its upper back contact 2, the shunt across condenser TM1(15) to thereby recycle the timer TM(15). Relay PCO(14), upon releasing, removes the ground from conductor 1410 permitting relay Z(13) to operate in parallel with relay W(13) over the lower contact 2 of relay W(13). Since relays W(13) and Z(13) are both operated, the next time this connector seizes a pretranslator it will prefer pretranslator "1" by operating relay PS1(13) rather than PS0(13) as above described. In the subsequent description of another call it will be assumed that relays W(13) and Z(13) are both operated but that pretranslators "1" and "2," represented by relays PS1(13) and PS2(13) are both busy. The latter assumptions are necessary since only pretranslator "0" has been disclosed in detail.

The release of relay PRS(9) for the first originating register extinguishes lamp RG(9) and releases relays PRA(10), PRB(10), and GS0(13). Relay GS0(13), upon releasing, releases relay GCO(14), which in turn extinguishes lamp RSG(14) and releases relays GAO(10) and GBO(10). The release of both of relays GAO(10) and GBO(10) releases relays GCAO(14). Relay GCAO(14), upon releasing, releases relays GK(13) and GK1(13), which jointly, upon releasing, release relay GRO(14).

*Pretranslator release*

The release of the connector circuit releases relays AC0(16), AC2(16), BC2(16), BC7(16), CC0(16), CC2(16), LT(17), RLK(22), PCK(22), and MB(21).

The release of relays BC2(16), BC7(16), CC0(16), CC2(16), and LT(17) causes the release of relays CR(18), CV(19), CVA(19), CZ9(17), BA9(18), and B9(18). The release of relays BA9(18), CR(18), CV(19), and CVA(19) release relays BS(20) and SW(20). Relay SW(20), upon releasing, releases relay SW1(20) which, in turn, releases relay LCM(20).

Relay RLK(22), upon releasing, releases relays TM(21) and LSD(20). Relay TM(21), upon releasing, extinguishes lamp PBL(21) and recycles the timer WT(21) by shunting condenser WT(21) over its upper back contact 4.

Relay MB(21), upon releasing, releases all CBO relays in all connector circuits (these CBO relays, as previously mentioned, are similar to relay CBO(13) of the connector circuit herein disclosed).

*Marker selection*

Under the above assumed conditions where a pretranslator was seized and requested to translate the seven-digit home area code 292, none of the relays CMA(5), CMB(5), CMC(5), CM3(5), or SD(5), was operated in response to the translation. The failure of any of these relays to be operated is by itself a directive to the originating register to seize a marker after seven digits have been registered, such directive being, in this case, the so-called "basic setting" for the home area. In accordance with the latter assumptions, punching CM1(5) is cross-connected to punching G(5), which latter punching is grounded by relay HS(5) operating at the end of registration in the G registers of Fig. 6 of the units digit of the seven-digit home area called number 292–XXXX. The successive operations and releases of the steering relays AS(1) to CS(1) and DS(5) to JS(5) has been explained previously and full details thereof may be found in the Busch disclosure.

After the units (or seventh) digit has been registered in the registers G0(6) to G7(6), relay HS(5) is operated, locking to off-normal ground on conductor 102, over its lower contact 6 and lower contact 1 of relay JS(5). Relays EV(1) and GS(5) remain operated. Relay HS(5), upon operating, completes a circuit for operating the marker start relay MST(1) extending from ground, over upper contact 12 of relay HS(5), punching G(5), cross-connection 506, punching CM1(5), lower contacts 3 of relays CM3(5), CMC(5), CMB(5), CMA(5), conductor 507, lower contact 22 of relay PST(1), conductor 115, lower contact 11 of relay DMS(5), lower contact 3 of relay SD(5), lower contact 1 of relay DMS(5), conductor 508, to battery through the winding of relay MST(1), which relay thereupon operates, in turn operating relay MST1(1) over an obvious circuit. Relay MST1(1), upon operating, opens at its lower contact 2 the pulse conductor 100 to prevent further pulse counting by the dial pulse counting circuit of Fig. 2. Relay MST1(1), upon operating, completes a circuit from off-normal ground, over lower contact 3 of relay ON(1), lower contact 1 of relay MST1(1), lower contact 6 of relay EV(1), conductor 118, upper contact 10 of relay HS(5), conductor 509, to battery through the winding of relay H7(6), which relay operates and locks over its upper contacts to conductor 600, to ground over lower contact 6 of relay ON(1). This relay H7(6) will eventually transmit a signal to the marker over its lower contacts, which signal is interpreted by the marker to the effect that the last digit is registered in the G—(6) registers.

Relay MST(1), upon operating, completes a start circuit from battery, over lower contact 2 of relay MST(1), lower contact of relay MRL(1) and conductor 116 to the originating register marker connector (shown in block form in Fig. 2), where the circuit functions are started toward interconnecting the register and an idle marker. The battery supply for operating connector relays in the marker connector is supplied over lower contact 3 of relay MST(1) and conductor 117 to the connector. The details of such a connector and its functioning may be found in the Busch disclosure. For present purposes the interconnection is assumed to take place as therein described.

*Transmission of information to marker*

The marker, as skeletonized in Figs. 3, 4, 7, 8, 11, and 12, shows only four of many registers for registering the digits recorded by the originating register because, for the present purposes, the present disclosure is concerned only with translation of office codes, and other special codes not necessarily involving the numerical part of the called number.

Upon the interconnection, by the marker connector, of the originating register and the marker, the information registered in the A—(2) to C—(2) and D—(6) to H—(6) relays is transmitted to the marker over cable 209, through the marker connector, cable 210, to the various receiving relays. Relays AC0(3) and AC2(3) are operated over circuits extending from grounds, over the lower contacts of relays A0(2) and A2(2), conductors 211 and 212, cable 209, connector, cable 210, conductors 300 and 301, to batteries through the windings of relays AC0(3) and AC2(3), which relays thereupon operate. Relays BC2(3) and BC7(3) are operated over circuits extending from grounds, over the lower contacts of relays B2(2) and B7(2), conductors 213 and 214, cable 209, connector, cable 210, conductors 302 and 303, to batteries through the windings of relays BC2(3) and BC7(3), which relays thereupon operate. Likewise, relays CC0(4) and CC2(4) are operated over circuits extending from grounds, over the lower contacts of relays C0(2) and C2(2), conductors 215 and 216, cable 209, connector, cable 210, conductors 400 and 401, to batteries through the windings of relays CC0(4) and CC2(4), which relays thereupon operate.

Two other circuits of present interest are completed: one for informing the marker what position the last called digit assumes; and the other for informing the marker what kind of an office code is involved. A circuit is completed from ground, over the lower contacts of relay H7(6), conductor 601, cable 209, connector, cable 210, to the marker to inform the latter that the last digit registered in the originating register was the seventh digit, or the one recorded in the register relays G0(6) to G7(6). A circuit is also completed for operating relay TC7(7), indicative of a seven-digit home or local area office code, extending from ground, over the upper back contact 5 of relay 11D(9), conductor 904, marker connector (Fig. 2), conductor 217, to battery through the winding of relay TC7(7), which thereupon operates.

*Translation of office code in marker*

Relay TC7(7), upon operating, completes a circuit for operating a local area route code relay ARC0(7) and a local relay BCL(7) extending from ground, over left contact 1 of relay TC7(7), punching L7(7), cross-connection 700, punching ARC0(7), through the winding of relay ARC0(7), punching ARS1(7), cross-connection 701, punching BCL(7), to battery through the winding of relay BCL(7). Relay ARC0(7), upon operating, completes circuits for operating the local relay CCL(8) and the two local area connector relays A0(12) and A1(12). Relay CCL(8) operates in a circuit extending from ground, over left contact 0 of relay ARC0(7), punching RG0(7), cross-connection 702, punching CCL(8), to battery through the winding of relay CCL(8). Relays A0(12) and A1(12) operate in circuits extending from grounds, over left contacts 1 and 2 of relay ARC0(7), punchings RG1(7) and RG2(7), cross-connections 703 and 704, punchings A0(8) and A1(8), conductors 800 and 801 to batteries through the windings of relays A0(12) and A1(12).

The registration of the A digit 2 in the register relays AC0(3) and AC2(3) operates relay AT2(7), one of eight such relays AT2(7) to AT9(7) of which only relays AT2(7) and AT9(7) have been shown, in a circuit extending from ground, over upper contact 6 of relay AC0(3), upper contact 4 of relay AC2(3), conductor 304, left contact 8 of relay TC7(7), conductor 705, cable 706, conductor 705, punching 7A2(7), cross-connection 707, punching AT2(7), to resistance battery through the winding of relay AT2(7).

The registration of the B digit 9 in the register relays BC2(3) and BC7(3) operates relay BT29(8), one of ten such relays BC20(8) to BC29(8) of which only relays BC20(8) and BC29(8) are shown (there would be ten such BC— relays for each AT— relay but the others are not shown), in a circuit extending from ground, over upper contact 6 of relay BC2(3), upper contact 6 of relay BC7(3), conductor 305, right contact 9 of relay BCL(7), conductor 708, cable 709, conductor 708, right contact 9 of relay AT2(7), punching C29(7), cross-connection 709, punching BT29(8), to resistance battery through the winding of relay BT29(8).

The registration of the C digit 2 in the register relays CC0(4) and CC2(4) applies ground, over upper contact 6 of relay CC0(4), upper contact 4 of relay CC2(4), conductor 402, left contact 2 of relay CCL(8), conductor 802, cable 803, conductor 802, left contact 2 of relay BT29(8), to punching C292(8). The ground on punching C292(8) is extended over cross-connection 803, punching 18(8), conductor 804, upper contact 18 of relay A1(12), to battery through the winding of relay LPA(12), which relay thereupon operates to indicate to the marker that this is a local call in a certain home office to which the marker has access, as fully described by Busch. Also, in accordance with the Busch disclosure, relay OR(12) is operated when the originating register seizes a marker and relay CS(12) is operated in accordance with the class of service to which the calling subscriber is entitled. An obvious circuit is therefore completed for operating the route relay R(12) and the route series relay RS(12), which relays, upon operating, in the manner fully set forth by Busch, instruct the marker as to the necessary switching directives for completing the call.

*Register release*

As soon as the marker has received information from the originating register as to the calling subscriber's line circuit location and has made connection thereto in preparation for extending the subscriber's circuit to the desired termination, the marker releases the originating register by operating relay MRL(1), all in accordance with the details disclosed by Busch. The marker grounds conductor 306 (Fig. 2), through the marker connector, over conductor 218, through the winding of relay MRL(1), to battery through the resistance MRL(1).

The operation of relay MRL(1) releases all all apparatus in the originating register and all apparatus interconnecting the register with the marker, as set forth by Busch, the release of the off-normal relay ON(1) causing the release of relay PST(1), which releases relay PRL(1).

*Marker release*

The marker embodies a means for holding its operated relays and apparatus in the operated condition after release of the register. Although such means is not shown, it is presumed to exist and reference may be made to the Busch disclosure for such details. When the marker has completed the desired connection or has turned the task over to some other equipment, it releases to normal, returning all operated equipment of Figs. 3, 4, 7, 8, 11, and 12 to normal.

*Abnormal operating conditions*

Abnormal operating conditions are such as abandoned calls, short circuits, open circuits, failure of various check paths at strategic times during normal operation, and various time-outs of the various timing circuits indicating that a particular sequence of operations has not been completed within an allotted duration of time. The above list is not intended to be all inclusive but is intended as illustrative.

ABANDONED CALL

If the originating register restores to normal, due to premature release by the calling subscriber, relay PST(1) is released removing ground from conductor 111 at lower contact 1 of relay PRL(1) and removing battery from conductor 112 at lower contact 3 of relay PRL(1) and removing ground from the conductors of cables C, D, and E of Fig. 10. If relay HD(22) of the pretranslator has operated due to the operation of relay PW1(20) or SW1(20), the removal of ground from the conductors of cables C, D, and E of Fig. 10, will release relay PW1(20) or SW1(20) thereby releasing relay HD(22), which, as above described, returns the pretranslator and connector circuits to normal. If relay HD(22) has not operated, the release of relay PST(1) will release relays PRS(9) and PS0(13) thereby releasing the connector and pretranslator circuits.

TIME-OUT CONDITIONS

As previously explained, if tube TRS(15) fires, due to the fact that the connector did not seize a pretranslator within about one-third of a second after having been seized itself, relay TRS(15) is operated by the discharge through tube TRS(15). Relay TRS(15) locks from ground, over its upper and lower contacts 2, lower contact 5 of relay TM1(15), to battery through the winding of relay TRS(15). As explained, the operation of relay TRS(15) shifts the pretranslator start potential from conductor 1503 to conductor 1505 to prefer the selection of pretranslator "1" instead of "0."

If a pretranslator is seized due to this transfer, as above described, a circuit is completed for operating relay TRS(22) of the pretranslator circuit, extending from ground, over upper and lower contacts 8 of relay TRS(15), conductor 1506, lower contact 8 of relay PCA0(14), conductor 1417, cable N to Fig. 22, conductor 1417, to battery through the winding of relay TRS(22), which relay thereupon operates. Relay TRS(22), upon operating, completes a locking path for relay HD(22) extending from ground, over lower contact 6 of relay HD(22), lower contact 2 of relay TRS(22), lower contact 11 and upper contact 12 of relay HD(22), to battery through the winding of relay HD(22). This locking path prevents the above-described normal release of relay HD(22), thereby preventing the above-described normal release of relays PC0(14), PCA0(14), and PK(15). If relay PK(15) fails to release normally, condenser TM1(15) will have acquired a charge sufficient to fire tube TM(15) thereby operating relay CA(15), as above indicated, to operate the major alarm device MJ(15). The failure of relay PC0(14) to release normally keeps relay TM(21) locked long enough to allow condenser WT(21) to fire tube WT(21) and operate relay WT(22), which locks over its lower contact 2 to positive battery through resistance WT4(22).

The operation of relay WT(22) operates relay TR(21) in a circuit extending from ground, over lower contact 5 of relay WT(22), conductor 2211, to battery through the lower winding of relay TR(21), which relay thereupon operates. Relay TR(21), upon operating initiates a series of circuit operations, not particularly important to an understanding of the present invention, whereby a testing circuit is seized for making a record of the reasons for the time-out failure. Relay TR(21) may be operated by many other abnormal conditions such as the grounding of two or more of the punchings BS—(20) and CM—(20). Such a condition would reduce the resistance in the circuit through the lower winding of relay XR(20), previously traced, by allowing both relays PW(20) and SW(20) to operate. Relay XR(20) therefore would operate extending ground over its left contact 2, conductor 2002, to battery through the upper winding of relay TR(20), etc.

The number and variety of trouble or abnormal conditions precludes a detailed discussion of them for such description has no particular bearing upon an understanding of the present invention. Let it suffice to say that operation of relay TR(21), by one of many conditions, signifies the need of a testing device to record the circuit condition at the time of the trouble. Such trouble recording or testing circuits are known to those skilled in the art.

*C digit zero*

If the called code is 290, the above operations of the register, pretranslator, and pretranslator connector circuits will not change except for the following.

Relays CR(18), CS(18), and CT(18) do not operate for a C digit of zero. Instead, relay CZC(17) is operated in a circuit extending from ground, over the upper contact 2 of relay BC2(16) or BC7(16) or relay CC7(16), conductor 1702, lower contacts 66 and 44 of relay LT(17), conductor 1801, upper contacts 4 of relays CC4(16) and CC7(16), which are operated for a C digit of zero, conductor 1604, to battery through the winding of relay CZC(17), which relay thereupon operates.

In response to the registration of the B digit 9, relays CZ9(17), BA9(18), and B9(18) operated as before, whereupon the punching 290(17) is grounded in a circuit extending from ground, over upper contact 4 of relay AC0(16), lower contact 2 of relay AC2(16), conductor 1602, lower contact 44 of relay CZC(17), lower contact 66 of relay CZ9(17), to punching 290(17). Since there is no need for translation of the C digit, as in the case of the R, S, and T punchings, punching 290(17) will be cross-connected to one of the BS—(20) or CM—(20) punchings directly, such as punching BSS(20), whereupon the register and marker operations would be the same as for the above-described code 292–XXXX, except that punching C290(8) would be grounded instead of punching C292(8).

Punching C290(8) may be cross-connected as desired to operate any route relay associated with the local area connector relays A1(12) and A0(12).

*Three-digit local call—with party letter*

It will be assumed that subscriber S(23) dials the seven-digit number 293–XXXX followed by a party letter, the value of which is not important.

All of the foregoing description regarding the same call with no party letter applies here except for certain details to be described presently.

Instead of the C digit of 2 being registered in register relays C0(2) and C2(2), the new C digit of 3 will be registered in relays C1(2) and C2(2).

Upon the operation of relay DS(5), after the registration of the C digit, relay PST(1) is operated, as before, to seize a connector (assumed to be the same one), which in turn seizes an idle pretranslator as above described. It was assumed, as previously described, that relays Z(13) and W(13) were both operated upon the last release of the connector, thereby energizing the pretranslator start conductor 1505 instead of 1503 both in Fig. 13. If it be assumed that pretranslator "1" is idl,e relay PS1(13) would be operated over conductor 1505 over the upper back contact 2 of relay CB1(13). Since only pretranslator "0" is shown in detail it will be assumed that pretranslators "1" and "2" are both busy (relays CB1(13) and CB2(13) operated), whereupon battery on start conductor 1505 is extended over upper front contact 2 of relays CB1(13) and CB2(13), upper back contact of relay CB0(13) to the winding of relay PS0(13) as before, whereupon pretranslator "0," assumed to be idle (relay CB0(13) released, as before), is seized.

Upon the operation of relay PCO(14), as before, the winding of relay W(13) is shunted by ground, over lower contact 4 of relay PCO(14), conductor 1410, and lower front contact 8 of relay Z(13). Relay W(13) releases, locking relay Z(13) over the lower normal contact of relay W(13) to ground on conductor 1410. Subsequently, upon the release of relay PCO(14), relay Z(13) is released returning the relays Z(13) and W(13) to their original condition where relay PS0(13) is preferred by the connector shown.

As before, relays AC0(16), AC2(16), BC2(16), and BC7(16) are operated to register in the pretranslator the A digit 2 and the B digit 9. Relays CC1(16) and CC2(16) will be operated to register the C digit 3. Relays LT(17), CZ9(17), BA9(18), and B9(18) will be operated as before and punching 29R(18) will again be grounded. Relay CR(18) will also be operated but this time in series with relays CWA(19) and CW(19) because of the fact that the C digit is 3 instead of 2. The latter circuit extends from ground, over the upper contact 2 of any one of relays BC2(16), BC7(16), and CC2(16), conductor 1702, lower contacts 44 and 66 of relay LT(17), conductor 1801, winding of relay CR(18), conductor 1601, upper contact 4 of relay CC1(16), lower contact 6 of relay CC2(16), conductor 1605, cable M to Fig. 19, conductor 1605, winding of relays CWA(19) and CW(19), to battery through resistance C(19). Upon the operation of relay CW(19), the ground on punching 29R(18) is extended over cross-connection 1802, punching P19(17), conductor 1704, left contact 12 of relay CWA(19), conductor 1902, punching W2(20), punching BSP(20), lower winding of relay BS(20), winding of relay PW(20), lower winding of relay XR(20), conductor 2103, to battery over the lower contact 7 of relay TM(21), operated as before.

Relays BS(20) and PW(20) operate in the above-traced circuit. Relay PW(20), upon operating, operates relay PW1(20) in an obvious circuit. Upon the operation of relay PW1(20), a circuit is completed for operating relays CSD(20) and SD(5) in series, extending from ground, through the winding of relay CSD(20), upper back contacts 1 and 4 of relay KTR(20), lower front contacts 5 and 2 of relay PW1(20), conductor 1015, cable F to Fig. 10, conductor 1015, upper contacts 2 of relays PBO(10), GBO(10), and PRB(10), conductor 505, cable B to Fig. 5, conductor 505, to battery through the winding of relay SD(5). Relays CSD(20) and SD(5) operate, relay SD(5) locking to ground after the connector release over lower contact 6 of relay SD(5), conductor 113, and lower contact 6 of relay PRL(1), as previously described.

The above-mentioned register circuit pretranslator release relay PRL(1) will be operated as previosuly described except that the operating circuit extending over the upper contact of relay BS(20) will continue to conductor 2001 over the upper contact 2 of relay CSD(20) instead of the lower contact 5 of relay SW1(20) as before.

Eventually, the pretranslator and its connector circuit will release to normal leaving relay SD(5) operated as the switching directive requested by the register of the pretranslator.

When relay HS(5) operates at the end of the registration of the seventh digit in the register relays G0(6) to G7(6), ground is extended over upper contact 12 of relay HS(5), punching G(5), cross-connection 506, punching CM1(5), lower contacts 3 of relays CM3(5), CMC(5), CMB(5) and CMA(5), conductor 507, lower contact 22 of relay PST(1), conductor 115, lower contact 11 of relay DMS(5), lower contact 5 of relay SD(5), conductor 510, conductor 907, through the dial pulse counting circuit in Fig. 2, conductor 219, lower contact 1 of relay DL1(9), upper contact 1 of relay DT(9), to battery through the winding of relay DL(9), which relay thereupon operates.

Relay DL(9), upon operating, removes at its upper contact 1 the resistance shunt across condenser DT(9) and, over its lower contact 4, closes ground on conductor 510 to the left side of the winding of relay DL1(9), the right side of which is shunted to ground on conductor 219 over lower contact 1 of relay DL1(9). Relay DL(9), upon operating, connects positive battery, through resistance DT(9), over upper contact 4 of relay DL(9), upper contact 1 of relay DL1(9), to anode 2 of gas tube DT(9) and through resistances DT3(9) and DT2(9), to condenser DT(9) which begins to acquire a charge to ground on off-normal conductor 908 over lower contact 9 of relay ON(1).

If condenser DT(9) is permitted to charge up for a period of from 3 to 5 seconds it will accumulate a charge sufficient to fire gas tube DT(9). If tube DT(9) fires it will operate relay DT(9) in so doing, in a circuit extending from positive battery, through resistance DT(9), over upper contact 4 of relay DL(9), upper contact 1 of relay DL1(9), electrode 2 of tube DT(9), across the ionized discharge in tube DT(9) to electrode 4, through the winding of relay DT(9), to off-normal ground on conductor 908. Relay DT(9), if operated, locks over its upper contact 4, through resistance DT4(9), to positive battery through resistance DT(9). Relay DT(9), if operated, opens, at its upper contact 1, the operating circuit of relay DL(9), thereby releasing that relay, which, when released, deionizes tube DT(9) and discharges condenser DT(9). Relay DT(9), upon operating, operates the marker start relay MST(1) in a circuit extending from ground, over lower contact 4 of relay DT(9), conductor 508, to battery through the winding of relay MST(1). Relay MST(1), upon operating, effects the seizure of an idle marker circuit, a previously described.

If a party letter is received by the dial pulse counting circuit before condenser DT(9) fires tube DT(9), then the operating circuit for relay DL(9) is opened in the dial pulse counting circuit, removing ground from conductor 218. The shunt is thereby removed from the winding of relay DL1(9) which operates in series with relay DL(9) to ground on conductor 510 over the lower contact of relay DL(9). Relay DL1(9), upon operating, closes a discharge path for condenser DT(9) over its upper contact 4, deionizes tube DT(9) and closes, over its lower contact 4 part of a circuit from ground on conductor 510, over conductor 907, through the dial pulse counting circuit, over conductor 219, lower contact 4 of relay DL1(9), conductor 508, to battery through the winding of relay MST(1). The latter circuit is completed by the dial pulse counting circuit at the end of the counting of the party letter or digit.

If both of the above conditions fail to operate relay MST(1), then when relay JS(5) operates at the end of registration of the eighth digit, a circuit is completed for operating relay MST(1), extending from ground, over upper contact 12 of relay JS(5), punching H(5), punching CM2(5), lower back contacts 2 of relays CM3(5), CMC(5), CMB(5), and CMA(5), conductor 511, lower contact 4 of relay PST(1), conductor 119, lower contact 1 of relay DMS(5), conductor 508, to battery through the winding of relay MST(1).

Thus, by virtue of the operation of relay SD(5) by the pretranslator in response to a request to translate the office code 293, the pretranslator has effectively directed the originating register to wait for an eighth digit or to wait from 3 to 5 seconds after registration of the seventh or units digit, whichever occurs first, before seizing an idle marker.

*Call involving an 11X toll directing code*

Subscribers, such as subscriber S(23), may have access to toll routes by direct dialing. In such cases, the called directory number of the foreign office subscriber may have the same office code and in fact the same numerical digits as a local subscriber. It is necessary, therefore, to prefix the foreign area office code with a special toll directing code in order for the control equipment in the local office to properly extend the connection. Such toll directing codes, in the present example, comprise the 11X variety where X can be any digit except 1, preceding the office code ABC-XXXX. In order to bring out certain features of the marker translation embodying a form of the invention, the toll directing code 112-292-XXXX will be assumed for the purpose of showing how the marker, as well as the pretranslator, distinguishes such code from the above-described local code 292-XXXX.

ABSORBING THE 11 PREFIX

When the subscriber S(23) dials an initial digit 1 ground is applied by the pulse counting circuit of Fig. 2 to conductor 220, over the upper back contact 2 of relay 11B(9), to battery through the winding of relay 11A(9), which relay operates and locks over its upper contacts 3 to off-normal ground on conductor 909 from lower contact 10 of off-normal relay ON(1). Just prior to the counting of the second digit, the counting circuit removes ground from conductor 220 and applies ground to conductor 221, over lower contacts 3 of relay 11A(9), to battery through the winding of relay 11B(9), which relay operates and locks to off-normal ground on conductor 909 over its lower contact 2. Upon the counting of the next digit, assumed to be the digit 1 again, ground is removed from conductor 221 and is reapplied to conductor 220, over upper front contact 2 of relay 11B(9), to battery through the winding of relay 11C(9), which relay operates and locks to off-normal ground on conductor 909 over its upper contacts 3. Relay 11C(9), upon operating, causes the operation of relay 11D(9) in an obvious circuit. Any dialing of additional "ones" will have no effect upon the register relays of Figs. 2 and 6 or of Fig. 9.

REGISTRATION OF THE CODE EXCLUSIVE OF THE 11 PREFIX

The X digit, assumed to be 2, of the 11X prefix will be registered in the register relays A0(2) and A2(2) as above described. Likewise the three office code digits, 292, will be registered respectively in register relays B0(2) and B2(2), C2(2) and C7(2), and D0(6) and D2(6).

PRETRANSLATOR FUNCTIONS

As before, as soon as three digits, exclusive of a 11 prefix, have been registered in the originating register, relay DS(5) operates to cause seizure of an idle pretranslator.

When a pretranslator has been seized and connected to, the information recorded in the digit registers and in relay 11D(9) is transmitted to the pretranslator. Relay 11X(17) is operated, instead of relay LT(17) as before, in a circuit extending from ground, over upper contact 5 of relay 11D(9), conductor 910, upper contacts 12 of relays PRB(10) and GBO(10) and PBO(10), conductor 1016, cable F to Fig. 20, conductor 1916, to battery through the winding of relay 11X(17). With the X digit of 2 registered in relays AC0(16) and AC2(16) and with relay 11X(17) operated, a circuit is completed from ground, over upper contact 4 of relay AC0(16), lower contact 2 of relay AC2(16), conductor 1602, lower contact 66 of relay 11X(17), to punching 11X2(17).

The ground on punching 11X2(17) is extended over cross-connection 1703 directly to punching CMSB(20) for providing the originating register with a directive to seize a marker after eight digits have been registered, exclusive of any 11 prefix.

Relay SW(20) operates as before, but this time in series with the upper winding of relay CMB(20) which operates also. Other pretranslator functions are the same as before. Relay CMB(20), upon operating, completes a circuit for operating relays CCM(20) and CMB(5) in series, extending from ground, through the winding of relay CCM(20), lower contacts 1 and 4 of relay KTR(20), upper front contact 2 of relay CMB(20), lower front contact 2 of relay CMB(20), conductor 1012, cable F to Fig. 10, conductor 1012, upper contacts 8 of relays PBO(10) and GBO(10) and PRB(10), conductor 502, cable B to Fig. 5, conductor 502, to battery through the winding of relay CMB(5). Relays CCM(20) and CMB(5) operate, the latter locking over its lower contact 6 to ground on conductor 113, after relay PRL(1) is operated as previously described. The locking ground shunts relay CCM(20) down and, when relay KTR(20) is operated by relay RLK(22), during the release process, relay LCM(20) operates in a circuit from battery, through the winding of relay LCM(20), lower contacts 7 and 4 of relay KTR(20), to the locking ground on relay CMB(5), above traced. The operation of relay LCM(20) confirms the locking of relay CMB(5) and permits the normal release of the pretranslator and its connector, above described.

MARKER SEIZURE

The operation of relay CMB(5) completes a circuit for operating the marker start relay MST(1) after the operation of steering relay JS(5) which as above indicated, operates after the eight digits have been registered, which in this case is 2–292–ThHTU), extending from ground in the dial pulse counting circuit, over conductor 205, lower contact 4 of relay EV(1), conductor 120, lower contact 10 of relay JS(5), punching J(5), punching CMB2(5), lower front contact 2 of relay CMB(5), lower back contact 2 of relay CMA(5), conductor 511, lower contact 4 of relay PST(1), conductor 119, lower contact 1 of relay DMS(5), conductor 508, to battery through the winding of relay MST(1), which operates and effects seizure of and connection to an idle marker circuit.

MARKER TRANSLATION

Pursuant to the interconnection of the originating register with a marker, the digits registered in the A—(2), B—(2), C—(2), and D—(6) registers are transferred to the marker along with the rest of the called number registered in Fig. 6. The X digit 2 is registered in relays AC0(3) and AC2(3); the A digit 2 is registered in relays BC2(3) and BC2(3); the B digit 9 is registered in relays CC2(4) and CC7(4); and, the C digit 2 is registered in relays DC0(4) and DC2(4).

To register the fact that this is an 11X code, relay 11X(7) is operated in a circuit extending from ground, over upper contact 5 of relay 11D(9), conductor 910, marker connector, conductor 222, to battery through the winding of relay 11X(7)

The registration of the X digit 2 completes a circuit for operating the foreign area code relay ARC1(7) and the BCF(7) relay for the foreign area, extending from ground, over upper contact 6 of relay AC0(3), upper contact 4 of relay AC2(3), conductor 304, left contact 8 of relay 11X(7), punching 11X2(7), punching ARC1(7), winding of relay ARC1(7), punching ARS1(7), punching BCF(7), to battery through the winding of relay BCF(7). Relay ARC1(7), upon operating, completes circuits for operating relays CCF(8), DCF(8), B0(11), and B1(11) associated with foreign area codes. Relays CCF(8) and DCF(8) operate in a circuit extending from ground, over left contact 10 of relay ARC1(7), punching RG10(7), cross-connection 710, punching DCF(8), winding of relay DCF(8), to battery through the winding of relay CCF(8). The relays B0(11) and B1(11) operate in respective circuits extending from ground, over left contacts 11 and 12 of relay ARC1(7), punchings RG11(7) and RG12(7), cross-connections 711 and 712, punchings B0(8) and B1(8), conductors 805 and 806, to batteries through the windings of foreign area connector cut-in relays B0(11) and B1(11).

In response to the registration of the A digit 2 in the registers BC0(3) and BC2(3), relay AT2(7) is operated in a circuit extending from ground, over upper contact 6 of relay BC0(3), upper contact 4 of relay BC2(3), conductor 307, left contact 2 of relay BCF(7), conductor 713, cable 714, conductor 713, punching AF2(7), cross-connection 715, punching AT2(7) to resistance battery through the winding of relay AT2(7).

In response to the registration of the B digit 9 in the register relays CC2(4) and CC7(4), relay BT29(8) is operated in a circuit extending from ground, over upper contacts 6 of relays CC2(4) and CC7(4), conductor 403, right contact 9 of relay CCF(8), conductor 807, cable 808, conductor 807, conductor 708, cable 709, conductor 708, right contact 9 of relay AT2(7), punching C29(7), cross-connection 709, punching BT29(8), to resistance battery through the winding of relay BT29(8).

In response to the registration of the C digit 2 in the register relays DC0(4) and DC2(4), punching C292(8) is grounded in a circuit extending from ground, over upper contact 6 of relay DC0(4), upper contact 4 of relay DC2(4), conductor 404, left contact 2 of relay DCF(8), left contact 2 of relay BT29(8), to punching C292(8), which, it will be recalled, was also grounded by the home or local code 292–XXXX, previously described.

Since the foreign area cut-in relays B0(11) and B1(11) are operated instead of the local or home area cut-in relays A0(12) and A1(12), as before, the grounding of punching C292(8) will be translated by the marker into a toll switching directive instead of local or home area routine information, as hereinbefore discussed.

The ground on punching C292(8) is extended over cross-connection 803, punching 18(8), conductor 804, upper contact 18 or relay B1(11), through the winding of route relay R(11), lower contact of relay CS1(11) which was operated to record the class of service to which the calling subscriber is entitled, to battery through the winding of the route series relay RS1(11). Relays R(11) and RS1(11), when operated, inform the marker of the correct switching information needed by the marker to extend the 112–292–XXXX toll call.

By a selective switching among the cut-in relays B0(11), B1(11), A0(12), and A1(12), depending upon whether the called code is a foreign area code or a home area code, the same punching, C292(8), when grounded may represent more than one translation. There could, of course, be additional area code relays, such as ARC0(7) and ARC1(7), and additional area code cut-in relays, such as B0(11), B1(11), A0(12), and A1(12).

In the particular embodiment shown, there are 24 punchings (0(11) to 5(11), 12(11) to 17(11), 6(8), to 11(8), and 18(8) to 23(8)) of which punchings 0(11) to 5(11) are assigned to routes in the local area, represented by cut-in relays A0(12) and A1(12), and are not assigned (vacant codes) in the foreign area. That is, in the foreign area, any code which grounds one of punchings 0(11) to 5(11) will operate relay ARRO(11), thereby grounding conductor 1100, which operates the vacant code route relay RV(8). In the local area, however, the regular route and route series relay operations take place.

The punchings 12(11) to 17(11) are of the opposite variety: namely; they represent true routes in the foreign area but represent vacant codes in the local or home area.

The punchings 6(8) to 11(8) and 18(8) to 23(8), one of which, namely, punching 18(8), was chosen for an illustration in the above-detailed descriptions, represent true codes in both areas.

Both the marker and the pretranslator embody varieties of the present invention as will be apparent at this stage in the specification. The concept of grouping untranslated information into groups which contain sets of such information which differ from each other by only one item and then making a common translation followed by a single distinguishing operation, considerably reduces the amount of circuits and apparatus normally and otherwise required to accomplish the same result.

In the marker, as an example, both the local code (292–XXXX) and the foreign area code (112–292–XXXX) were given a common translation (grounding of punching C292(8) followed by a separation or distinction depending upon whether the code was local (relays A0(12) and A1(12) operated) or foreign (relays B0(11) and B1(11) operated).

In the pretranslator, as an example, all three office codes (291, 292, and 293) were given a common translation (punching 29R(18) grounded) followed by a separation or distinction depending upon the value of the last digit (relays CU(19) or CV(19) or CW(20) operated), the latter being particularly novel in the manner and means of combining codes into groups of three having different consecutive last digits and then separating the codes into groups of three having different last digits differing from each other by three pulses each, thus permitting twenty-seven punchings P0(17) to P26(17) to represent twenty-seven different combinations of three codes each of code to switching directive translations.

*Vacant code call*

If a code for a local office is dialed which is a vacant code (unassigned as regards local routes) the pretranslator is arranged to instruct the originating register to seize a marker after three digits have been registered. It will be recalled that it was assumed that punching 29R(18), representing codes 291, 292, and 293, was cross-connected to punching P19(17). Such was assumed on the basis that code 291 required a W3(20) translation and code 292, a W1(20) translation and code 293, a W2(20) translation. It is assumed, as will be apparent, that code 291 is a vacant code in the local area.

In the pretranslator, as will be apparent from prior description, code 291 will effect the grounding of punching 29R(18). Furthermore, since the C digit is 1, relay CU(19) and CUA(19) will be operated in a circuit from battery, through resistance C(19), windings of relays CU(19) and CUA(19), conductor 1903, cable M to Fig. 16, conductor 1903, lower control 4 of relay CC1(16), upper contact 4 of relay CC0(16), to ground previously traced over conductor 1601. The ground on punching 29R(18) is extended over cross-connection 1802, punching P19(17), conductor 1704, left contact 12 of relay CUA(19), conductor 1904, punching W3(20), to punching CMS3(20), for providing the originating register with a directive to seize a marker after three digits have been registered, exclusive of any 11 prefix.

Relay SW(20) operates as before, but this time in series with the upper winding of relay CM3(20) which operates also. Other pretranslator functions are the same as before. Relay CM3(20), upon operating, completes a circuit for operating relays CCM(20) and CM3(5) in series, extending from ground, through the winding of relay CCM(20), lower contacts 1 and 4 of relay KTR(20), upper front contact 2 of relay CM3(20), lower front contact 2 of relay CM3(20), conductor 1014, cable F to Fig. 10, conductor 1014, upper contacts 4 of relays PBO(10) and GBO(10) and PRB(10), conductor 504, cable B to Fig. 5, conductor 504, to battery through the winding of relay CM3(5). Relays CCM(20) and CM3(5) operate, the latter locking over its lower contact 6 to ground on conductor 113, after relay PRL(1) is operated as previously described. The locking ground shunts relay CCM(20) down and, when relay KTR(20) is operated by relay RLK(22), during the release process, relay LCM(20) operates in a circuit from battery, through the winding of relay LCM(20), lower contacts 7 and 4 of relay KTR(20), to the locking ground on relay CM3(5), above traced. The operation of relay LCM(20) confirms the locking of relay CM3(5) and permits the normal release of the pretranslator and its connector, above described.

*Marker seizure*

The operation of relay CM3(5) completes a circuit for operating the marker start relay MST(1) immediately, extending from ground, over lower contact 4 of relay DMS(5), lower contact 5 of relay CM3(5), lower back contact 2 of relay SD(5), conductor 503 to battery through the winding of relay MST(1), which operates and effects seizure of and connection to an idle marker circuit.

*Marker translation*

It will be apparent from prior description that punching C291(8) will be grounded in the marker as a result of having transferred there to the code 291 from the originating register.

Since this is a local call, relays A0(12) and A1(12) will be operated as before thereby completing a circuit from ground on punching C291(8), over cross-connection 809, winding of route relay R(8), conductor 810, punching 17(11), conductor 1101, lower contact 17 of relay A1(12), punching ARRO(12), conductor 1200 to battery through the winding of relay ARRO(11). Relay ARRO(11) is of high resistance thereby prohibiting the operation of relay R(8) in series therewith as it operates in the latter circuit. Relay ARRO(11), upon operating, grounds conductor 1100 to operate the vacant code route relay RV(8) thereby instructing the marker to switch this call according to the usual method of handling such calls, such as to an operator or to a "no such number" tone trunk, etc.

If the code 291 were involved in a toll directing code system, such as 11X–291–XXXX, the same punching C291(8) would be grounded. However, in this instance, relays B0(11) and B1(11) would be operated instead of the local switching relays A0(12), A1(12), as has been explained. Thus the ground on punching C291(8) would extend over cross-connection 809, winding of route relay R(8), conductor 810, punching 17(11), lower contact 17 of relay B1(11), contact of class of service relay CS0(11), to battery through the route series relay RS0(11). Both of relays R(8) and RS0(11) operate in this instance because relay RS0(11) is of low resistance. Thus the code 291 has a definite route in the foreign area.

Figure 8:
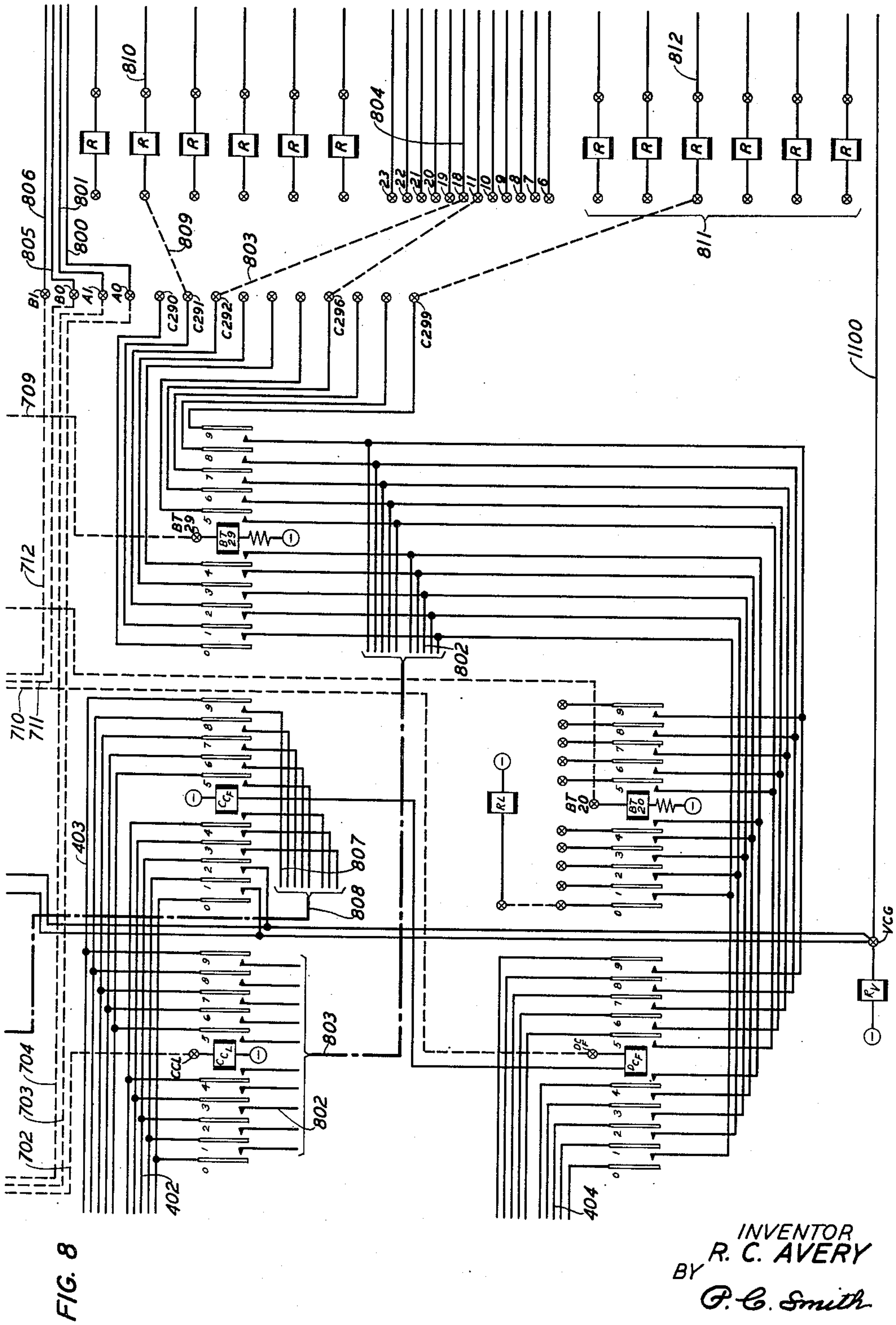

Likewise, the code points collectively indicated by numeral 811 in Fig. 8 represent codes which are all of the same route in the foreign area, such as the illustrated vacant code route, but are of different routes in the local area. Although vacant code routing has been shown by example, it will be apparent that a number of codes in the foreign area, for instance, could have a common tandem or toll route.

Figure 11:
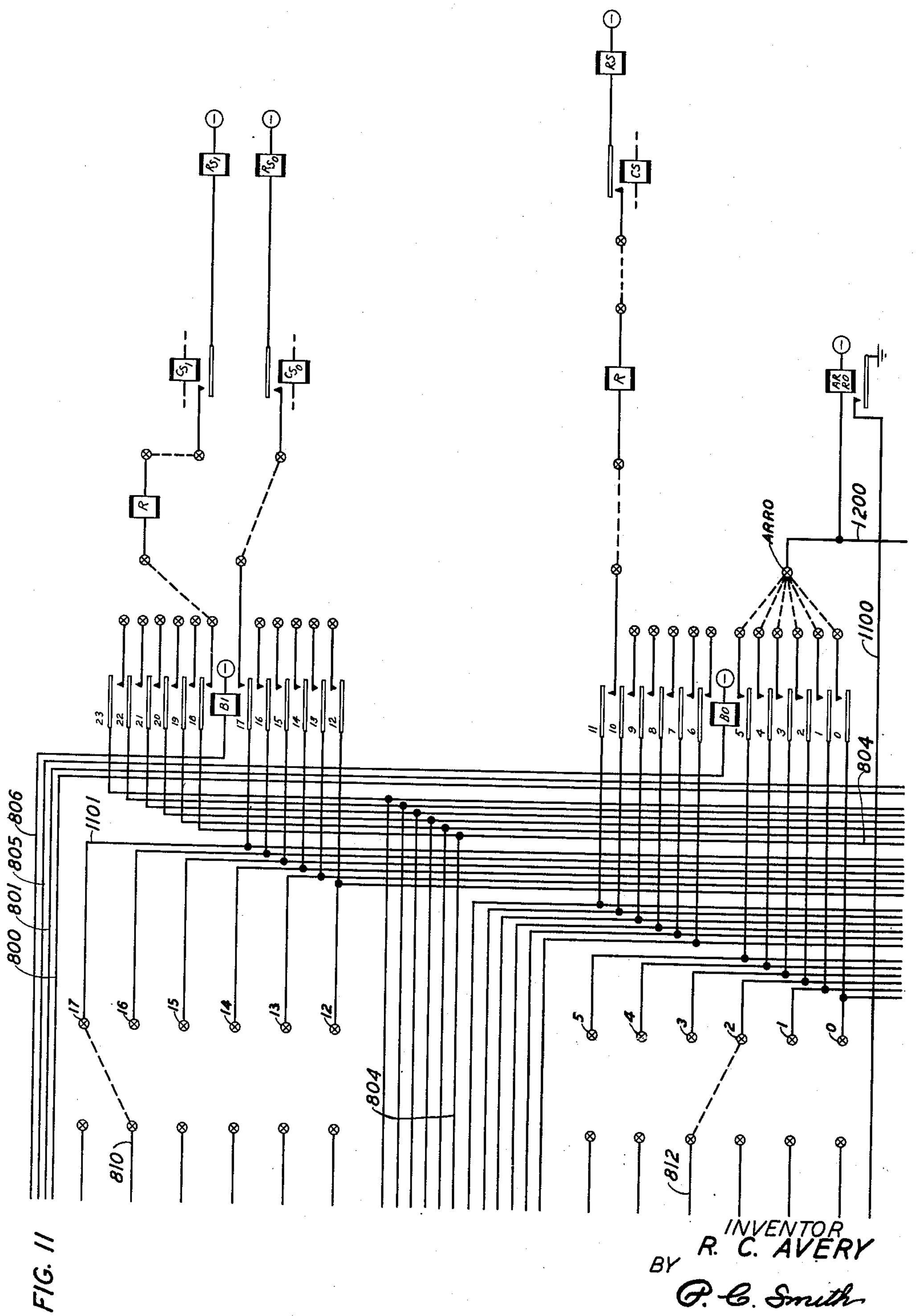
Figure 12:
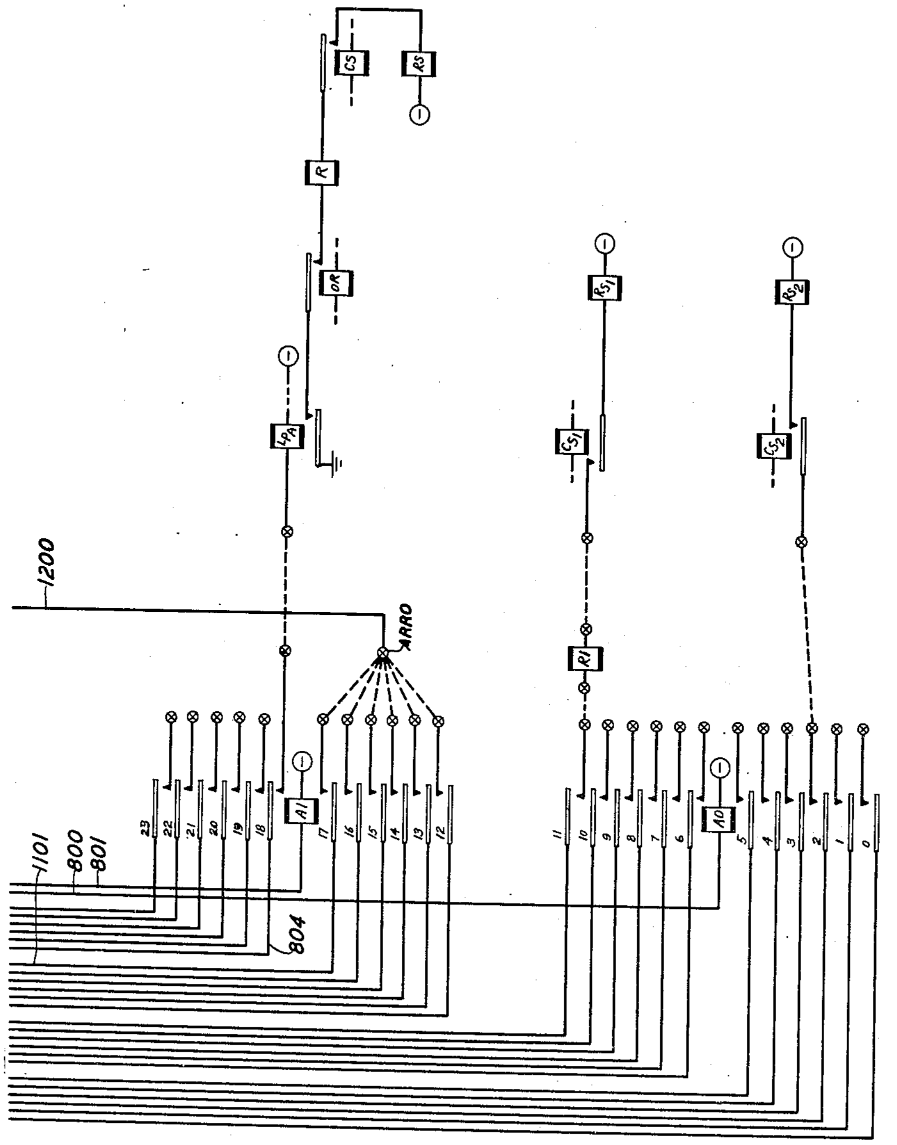

The advantage of the marker translator arrangement shown as embodying one aspect of the invention is that if each of the different routes represented by the route relays 811 require a common charge rate, say five or ten cents, each one may be cross-connected to the same punching 0(11) to 5(11), thereby to use a common route series relay, such as relay RS2(12), and thereby considerably reduce the number of conductors, relays, contacts, punchings, etc., shown in Figs. 11 and 12. For offices having a large number of routes, where some may have the same charge rate, this aspect of the invention effects a material saving in equipment.

It is to be understood that the above-described arrangements are illustrative of the application of the principles of the invention. Numerous other arrangements may be devised by those skilled in the art without departing from the spirit and scope of the invention.

What is claimed is:

1. A translating arrangement comprising in combination register means settable for registering a set of information where said set includes a plurality of items of information, a portion of said register means being individual to and settable in accordance with one item of said set, a group of such sets of information containing only sets which differ from each other by only said one item of information, means for setting said register means according to any said set, first terminals, first switching means whereby the setting of said entire register means energizes the same first terminal for all sets of a group, second terminals, and second switching means whereby the setting of only the portion of said register means individual to said one item of information causes the energization of said same first terminal to energize one of said second terminals.

2. A translating arrangement comprising in combination a plurality of registers settable for registering a set of information where said set includes a plurality of items of information, each of said registers being individual to and settable in accordance with a different item of said set, a group of such sets of information containing only sets which differ from each other by only one item of information, means for setting said register according to any said set, first terminals, first switching means whereby the setting of all of said registers energizes the same first terminal for all sets of a group, second terminals, and second switching means whereby the setting of only the one of said registers individual to said one item of information causes the energization of said same first terminal to energize one of said second terminals.

3. A translating arrangement for telephone switching systems comprising in combination three registers settable for registering telephone office codes to be translated into switching directives where each code comprises at least three code digits, said three registers consisting of first and second and third digit registers individual to and settable in accordance with respective first and second and third digits of said codes, a group of such codes containing only three codes which differ from each other by only the third digit where third digits of a code are in consecutive digital sequence, means for setting said first and second and third digit registers according to the respective first and second and third digits of any said code, a plurality of first terminals, first switching relay means whereby the setting of all of said registers energizes the same one of said first terminals for all three codes of a group, three second terminals, each second terminal when energized representing a different switching directive, and second switching relay means whereby the setting of only said third digit register causes the energization of said same first terminal to energize one of said second terminals.

4. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means whereby any one of the three code settings of all of said registers in accordance with any subgroup of codes energizes only the particular first terminal associated with that subgroup of codes, three second terminals, each second terminal when energized representing a different switching directive, and second switching relay means whereby the setting of only said third register causes the energization of said particular first terminal to energize one of said second terminals.

5. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means whereby any one of the three code settings of all of said registers in accordance with any subgroup of codes energizes only the particular first terminal associated with that subgroup of codes, said first relay means including three first relays operatively connected to said third register such that one of said three first relays operates when said third code digit is a 1, 2 or 3 and a second of said three first relays operates when said third code digit is a 4, 5 or 6 and the third of said three first relays operates when said third code digit is a 7, 8 or 9, three second terminals, each second terminal when energized representing a different switching directive, and second switching relay means whereby the setting of only said third register causes the energization of said particular first terminal to energize one of said second terminals.

6. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means whereby any one of the three code settings of all of said registers in accordance with any subgroup of codes energizes only the particular first terminal associated with that subgroup of codes, said first relay means including three first relays operatively connected to said third register such that one of said three first relays operates when said third code digits is a 1, 2 or 3 and a second of said three first relays operates when said third code digit is a 4, 5 or 6 and the third of said three first relays operates when said third code digit is a 7, 8 or 9, three second terminals, each second terminal when energized representing a different switching directive, and second switching relay means whereby the setting of only said third register causes the energization of said particular first terminal to energize one of said second terminals, said second relay means including three second relays operatively connected to said third register such that one of said three second relays operates when said third code digit is a 1, 4 or 7 and a second of said three second relays operates when said third code digit is a 2, 5 or 8 and a third of said second relays operates when said third code digit is a 3, 6 or 9.

7. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means whereby any one of the three codes settings of all of said registers in accordance with any subgroup of codes energizes only the particular first terminal associated with that subgroup of codes, said first relay means including a first set of three first relays operatively connected to said third register such that one of said three first relays operates when said third code digit is a 1, 2 or 3 and a second of said three first relays operates when said third code digit is a 4, 5 or 6 and the third of said three first relays operates when said third code digit is a 7, 8 or 9, three second terminals, each second terminal when energized representing a different switching directive, and second switching relay means whereby the setting of only said third register causes the energization of said particular first terminal to energize one of said second terminals, said second relay means including a second set of three second relays operatively connected to said third register such that one of said three second relays operates when said third code digit is a 1, 4 or 7 and a second of said three second relays operates when said third code digit is a 2, 5 or 8 and a third of said second relays operates when said third code digit is a 3, 6 or 9, said operative connections of said first and second sets of relays to said third register comprising connections whereby the setting of only said third register selectively operates only a selected one of said first set of relays and only a selected one of said second set of relays in series with each other.

8. A translating arrangement comprising in combination register means settable for registering a set of information where said set includes a plurality of items of information, a portion of said register means being individual to and settable in accordance with one item of said set, a group of such sets of information containing only sets which differ from each other by only said one item of information, means for setting said register means according to any said set, first terminals, first switching means operative to energize the same first terminal for all sets of a group, circuit means interconnecting said first switching means with said entire register means whereby the setting of said entire register means operates said first switching means, second terminals, second switching means operative to cause the energization of said same first terminal to energize one of said second terminals, and circuit means interconnecting said second switching means with only the portion of said register means individual to said one item of information whereby the setting of only the portion of said register means individual to said one item of information operates said second switching means.

9. A translating arrangement comprising in combination a plurality of registers settable for registering a set of information where said set includes a plurality of items of information, each of said registers being individual to and settable in accordance with a different item of said set, a group of such sets of information containing only sets which differ from each other by only one item of information, means for setting said registers according to any said set, first terminals, first switching means operative to energize the same first terminal for all sets of a group, circuit means interconnecting said first switching means with all of said registers whereby the setting of all of said registers operates said first switching means, second terminals, second switching means operative to cause the energization of said same first terminal to energize one of said second terminals, and circuit means interconnecting said second switching means with only the one of said registers individual to said one item of information whereby the setting of only the one of said registers individual to said one item of information operates said second switching means.

10. A translating arrangement for telephone switching systems comprising in combination three registers settable for registering telephone office codes to be translated into switching directives where each code comprises at least three code digits, said three registers consisting of first and second and third digit registers individual to and settable in accordance with respective first and second and third digits of said codes, a group of such codes containing only three codes which differ from each other by only the third digit where third digits of a code are in consecutive digital sequence, means for setting said first and second and third digit registers according to the respective first and second and third digits of any said code, a plurality of first terminals, first switching relay means operative to energize the same one of said first terminals for all three codes of a group, circuit means interconnecting said first relay means with all of said registers whereby the setting of all of said registers operates said first relay means, three second terminals, each second terminal when energized representing a different switching directive, second switching relay means operative to cause the energization of said same first terminal to energize one of said second terminals, and circuit means interconnecting said second relay means with only said third digit register whereby the setting of only said third digit register operates said second relay means.

11. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means operative to energize only the particular first terminal associated with any subgroup of codes, circuit means interconnecting said first relay means with all of said registers whereby any one of the three code settings of all of said registers operates said first relay means in accordance with that subgroup of codes, three second terminals, each second terminal when energized representing a different switching directive, second switching relay means operative to cause the energization of said particular first terminal to energize one of said second terminals, and circuit means interconnecting said second relay means with only said third register whereby the setting of only said third register operates said second relay means.

12. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means operative to energize only the particular first terminal associated with any subgroup of codes, circuit means interconnecting said relay means with all of said registers whereby any one of the three code settings of all of said registers operates said first relay means in accordance with that subgroup of codes, said first relay means including three first relays and said last-mentioned circuit means including circuit connections between said three first relays and only said third register whereby one of said three first relays operates when said third code digit is a 1, 2 or 3 and a second of said three first relays operates when said third code digit is a 4, 5 or 6 and the third of said three first relays operates when said third code digit is a 7, 8 or 9, three second terminals, each second terminal when energized representing a different switching directive, second switching relay means operative to cause the energization of said particular first terminal to energize one of said second terminals, and circuit means interconnecting said second relay means with only said third register whereby the setting of only said third register operates said second relay means.

13. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means operative to energize only the particular first terminal associated with any subgroup of codes, circuit means interconnecting said relay means with all of said registers whereby any one of the three code settings of all of said registers operates said first relay means in accordance with that subgroup of codes, said first relay means including three first relays and said last-mentioned circuit means including circuit connections between said three first relays and only said third register whereby one of said three first relays operates when said third code digit is a 1, 2 or 3 and a second of said three first relays operates when said third code digit is a 4, 5 or 6 and the third of said three first relays operates when said third code digit is a 7, 8 or 9, three second terminals, each second terminal when energized representing a different switching directive, second switching relay means operative to cause the energization of said particular first terminal to energize one of said second terminals, and circuit means interconnecting said second relay means with only said third register whereby the setting of only said third register operates said second relay means, said second relay means including three second relays and said last-mentioned circuit means including circuit connections between said three second relays and only said third register whereby one of said three second relays operates when said third code digit is a 1, 4 or 7 and a second of said three second relays operates when said third code digit is a 2, 5 or 8 and a third of said second relays operates when said third code digit is a 3, 6 or 9.

14. A translating arrangement for telephone switching systems comprising in combination first and second and third registers settable for registering respective first and second and third digits of three digit telephone office codes to be translated into switching directives, a group of such codes containing only codes which differ from each other by only the third digit, each group of such codes containing three subgroups of such codes where the three codes of a subgroup are in consecutive digital sequence, means for setting said first and second and third registers according to the respective first and second and third digits of any said code, a first terminal for each subgroup, first switching relay means operative to energize only the particular first terminal associated with any subgroup of codes, circuit means interconnecting said relay means with all of said registers whereby any one of the three code settings of all of said registers operates said first relay means in accordance with that subgroup of codes, said first relay means including a first set of three first relays and said last-mentioned circuit means including circuit connections between said three first relays and only said third register whereby one of said three first relays operates when said third code digit is a 1, 2 or 3 and a second of said three first relays operates when said third code digit is a 4, 5 or 6 and the third of said three first relays operates when said third code digit is a 7, 8 or 9, three second terminals, each second terminal when energized representing a different switching directive, second switching relay means operative to cause the energization of said particular first terminal to energize one of said second terminals, and circuit means interconnecting said second relay means with only said third register whereby the setting of only said third register operates said second relay means, said second relay means including a second set of three second relays and said last-mentioned circuit means including circuit connections between said three second relays and only said third register whereby one of said three second relays operates when said third code digit is a 1, 4 or 7 and a second of said three second relays operates when said third code digit is a 2, 5 or 8 and a third of said second relays operates when said third code digit is a 3, 6 or 9, said circuit connections between said first and second sets of relays and only said third register comprising connections whereby the setting of only said third register selectively operates only a selected one of said first set of relays and only a selected one of said second set of relays in series with each other.

References Cited in the file of this patent

UNITED STATES PATENTS

| Number | Name | Date |
|---|---|---|
| 1,721,920 | Passmore | July 23, 1929 |
| 1,721,640 | Ruggles | July 23, 1929 |
| 1,811,146 | Richardson et al. | June 23, 1931 |
| 1,903,019 | Wright et al. | Mar. 28, 1933 |
| 2,108,140 | Paterson | Feb. 15, 1938 |
| 2,201,573 | Carpenter | May 21, 1940 |
| 2,355,908 | Dehn | Aug. 15, 1944 |
| 2,409,063 | Ostline | Oct. 8, 1946 |
| 2,468,300 | Maloney et al. | Apr. 26, 1949 |
| 2,528,269 | Du Bois | Oct. 31, 1950 |